United States Patent
Agiwal et al.

(10) Patent No.: US 12,520,376 B2
(45) Date of Patent: Jan. 6, 2026

(54) METHOD AND APPARATUS FOR HANDLING RADIO LINK FAILURE IN A CELL SUPPORTING NETWORK ENERGY SAVINGS IN A WIRELESS COMMUNICATION SYSTEM

(71) Applicant: SAMSUNG ELECTRONICS CO., LTD., Suwon-si (KR)

(72) Inventors: Anil Agiwal, Suwon-si (KR); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 18/415,392

(22) Filed: Jan. 17, 2024

(65) Prior Publication Data

US 2024/0251473 A1 Jul. 25, 2024

(30) Foreign Application Priority Data

Jan. 19, 2023 (KR) .......................... 10-2023-0007835

(51) Int. Cl.
*H04W 76/28* (2018.01)
*H04W 24/08* (2009.01)
*H04W 56/00* (2009.01)
*H04W 76/27* (2018.01)

(52) U.S. Cl.
CPC .......... *H04W 76/28* (2018.02); *H04W 24/08* (2013.01); *H04W 56/0015* (2013.01); *H04W 76/27* (2018.02)

(58) Field of Classification Search
CPC . H04W 76/28; H04W 24/08; H04W 56/0015; H04W 76/27
See application file for complete search history.

(56) References Cited

U.S. PATENT DOCUMENTS

| | | | |
|---|---|---|---|
| 11,470,551 B2 | 10/2022 | Xi et al. | |
| 2020/0322890 A1* | 10/2020 | Menon | H04W 24/10 |
| 2021/0029636 A1 | 1/2021 | Yilmaz et al. | |
| 2023/0007587 A1 | 1/2023 | Ly et al. | |
| 2023/0040867 A1* | 2/2023 | Hori | H04W 48/20 |

FOREIGN PATENT DOCUMENTS

| | | | | |
|---|---|---|---|---|
| EP | 4096261 A1 | 11/2022 | | |
| KR | 10-2012-0123392 A | 11/2012 | | |
| KR | 10-2024-0006273 A | 1/2024 | | |
| WO | WO-2024035802 A1 * | 2/2024 | ............ | H04W 76/28 |
| WO | WO-2024150178 A1 * | 7/2024 | ........ | H04W 52/0235 |

OTHER PUBLICATIONS

International Search Report and Written Opinion of the International Searching Authority dated May 1, 2024, in connection with International Application No. PCT/KR2024/000844, 9 pages.
Interdigital, "Report of [301][NES] Summary of DTX/DRX-8.3.2", R2-2213075, 3GPP RAN WG2 Meeting #120, Toulouse, France, Nov. 14-19, 2022, 16 pages.

* cited by examiner

*Primary Examiner* — Edan Orgad
*Assistant Examiner* — Samuel Roberge Bettendorf

(57) ABSTRACT

The disclosure relates to a 5G or 6G communication system for supporting a higher data transmission rate. Specifically, the present disclosure provides a method and apparatus for handling RLF in a cell supporting network energy saving in a wireless communication system.

14 Claims, 14 Drawing Sheets

METHOD AND APPARATUS FOR HANDLING RADIO LINK FAILURE IN A CELL SUPPORTING NETWORK ENERGY SAVINGS IN A WIRELESS COMMUNICATION SYSTEM

CROSS-REFERENCE TO RELATED APPLICATION

This application is based on and claims priority under 35 U.S.C. § 119 to Korean Patent Application No. 10-2023-0007835 filed on Jan. 19, 2023, in the Korean Intellectual Property Office, the disclosure of which is incorporated by reference herein in its entirety.

BACKGROUND

1. Field

The disclosure relates to a wireless communication system (or a mobile communication system). Specifically, the disclosure relates to an apparatus, a method and a system for handling radio link failure (RLF) in a cell supporting network energy saving) wireless communication system.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mm Wave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies onetenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mm Wave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Recently, there are needs to enhance RLF procedure for a cell supporting network energy saving.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a terminal is provided. The method comprises: receiving, from a base station, a radio resource control (RRC) message including first information configuring a cell discontinuous transmission (DTX) for a special cell (SpCell) and second information configuring at least one radio link monitoring reference signal (RLM RS) resource for the SpCell; starting a T310 timer according to a number of consecutive out of sync indications are received for the SpCell, wherein the number of consecutive out of sync indications are based on a downlink radio link quality associated with the at least one RLM RS resource; and in case that the cell DTX for the SpCell is started, stopping the T310 timer.

In accordance with another aspect of the disclosure, a terminal is provided. The terminal comprises: a transceiver; and a controller coupled with the transceiver and configured to: receive, from a base station, a radio resource control (RRC) message including first information configuring a cell discontinuous transmission (DTX) for a special cell (SpCell) and second information configuring at least one radio link monitoring reference signal (RLM RS) resource for the SpCell, start a T310 timer according to a number of consecutive out of sync indications are received for the SpCell, wherein the number of consecutive out of sync indications are based on a downlink radio link quality associated with the at least one RLM RS resource, and in case that the cell DTX for the SpCell is started, stop the T310 timer.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
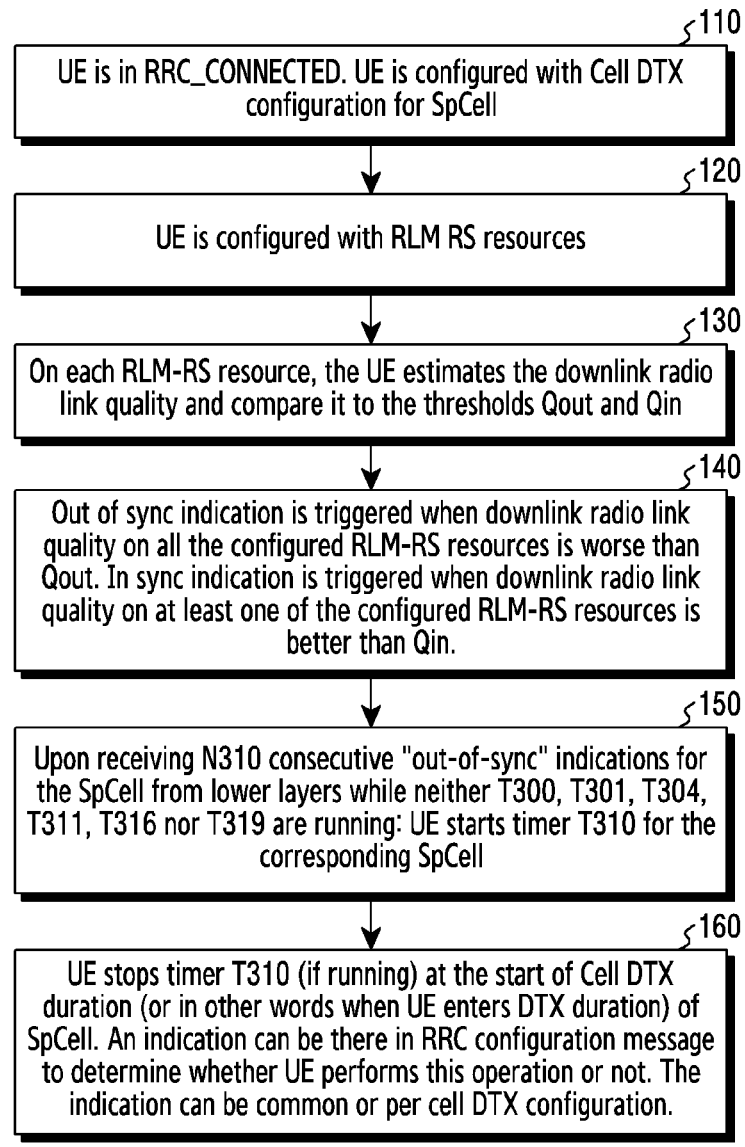
FIG. 1 illustrates an example of RLF handling for a cell supporting network energy saving in accordance with an embodiment of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module" or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the recent years, several broadband wireless technologies have been developed to meet the growing number of broadband subscribers and to provide more and better applications and services. The second-generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mm Wave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example, use cases the fifth generation wireless communication system wireless system is expected to address is enhanced Mobile Broadband (eMBB), massive Machine Type Communication (m-MTC), ultra-reliable low latency communication (URLLC) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IOT)/Internet of Everything (IoE) envisioning connectivity of billions of devices. The URLLC requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, a UE and a gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of RX beam patterns of different directions. Each of these receive patterns can be also referred as RX beam.

The fifth generation wireless communication system, supports standalone mode of operation as well dual connectivity (DC). In DC a multiple Rx/Tx UE may be configured to utilise resources provided by two different nodes (or NBs) connected via non-ideal backhaul. One node acts as the Master Node (MN) and the other as the Secondary Node (SN). The MN and SN are connected via a network interface and at least the MN is connected to the core network. New Radio (NR) also supports Multi-RAT Dual Connectivity (MR-DC) operation whereby a UE in a radio resource control connected (RRC_CONNECTED) is configured to utilise radio resources provided by two distinct schedulers, located in two different nodes connected via a non-ideal backhaul and providing either Evolved Universal Terrestrial Radio Access (E-UTRA) (i.e., if the node is an ng-eNB) or NR access (i.e., if the node is a gNB). In NR for a UE in RRC_CONNECTED not configured with CA/DC there is only one serving cell comprising of the primary cell. For a UE in RRC_CONNECTED configured with CA/DC the term "serving cells" is used to denote the set of cells comprising of the Special cell(s) and all secondary cells. In NR the term master cell group (MCG) refers to a group of serving cells associated with the master node, comprising of the primary cell (PCell) and optionally one or more secondary cells (SCells). In NR the term secondary cell group (SCG) refers to a group of serving cells associated with the Secondary Node, comprising of the primary SCG cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, SCell is a cell providing additional radio resources on top of Special cell. PSCell refers to a serving cell in SCG in which the UE performs random access when performing the Reconfiguration with Sync procedure. For Dual Connectivity operation the term special cell (SpCell) refers to the PCell of the MCG or the PSCell of the SCG, otherwise the term Special cell refers to the PCell.

PDCCH in fifth generation wireless communication system: In the fifth generation wireless communication system, physical downlink control channel (PDCCH) is used to schedule downlink (DL) transmissions on physical downlink shared channel (PDSCH) and uplink (UL) transmissions on physical uplink shared channel (PUSCH), where the downlink control information (DCI) on PDCCH includes: downlink assignments containing at least modulation and coding format, resource allocation, and hybrid automatic repeat request (HARQ) information related to downlink shared channel (DL-SCH); uplink scheduling grants containing at least modulation and coding format, resource allocation, and hybrid-ARQ information related to uplink shared channel (UL-SCH). In addition to scheduling, PDCCH can be used to for: activation and deactivation of configured PUSCH transmission with configured grant; activation and deactivation of PDSCH semi-persistent transmission; notifying one or more UEs of the slot format; notifying one or more UEs of the physical resource block(s) (PRB(s)) and orthogonal frequency division multiplexing (OFDM) symbol(s) where the UE may assume no transmission is intended for the UE; transmission of transmission power control (TPC) commands for physical uplink control channel (PUCCH) and PUSCH; Transmission of one or more TPC commands for sounding reference signal (SRS) transmissions by one or more UEs; switching a UE's active bandwidth part; Initiating a random access procedure.

A UE monitors a set of PDCCH candidates in the configured monitoring occasions in one or more configured control resource sets (CORESETs) according to the corresponding search space configurations. A CORESET consists of a set of PRBs with a time duration of 1 to 3 OFDM symbols. The resource units resource element groups (REGs) and control channel elements (CCEs) are defined within a CORESET with each CCE including a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In fifth generation wireless communication system, a list of search space configurations is signaled by GNB for each configured BWP wherein each search configuration is uniquely identified by an identifier. Identifier of search space configuration to be used for specific purpose such as paging reception, SI reception, random access response reception is explicitly signaled by a gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots "x" to x+duration where the slot with number "x" in a radio frame with number "y" satisfies the equation below:

$$(y*(\text{number of slots in a radio frame}) + x - \text{Monitoring-offset-}PDCCH\text{-slot}) \mod(\text{Monitoring-periodicity-}PDCCH\text{-slot}) = 0.$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of coreset configuration associated with it. A list of coreset configurations is signalled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on a sub carrier spacing. The number of slots in a radio frame and duration of slots depends on a radio frame for each supported subcarrier spacing (SCS) is pre-defined in NR. Each coreset configuration is associated with a list of transmission configuration indicator (TCI) states. One DL reference signal (RS) ID (synchronization signal block (SSB) or channel state information (CSI) RS) is configured per TCI state. The list of TCI states corresponding to a coreset configuration is signalled by a gNB via RRC signaling. One of the TCI states in TCI state list is activated and indicated to a UE by a gNB via medium access control (MAC) control element (CE). TCI state indicates the DL TX beam (DL TX beam is quasi-collocated (QCLed) with SSB/CSI RS of TCI state) used by the gNB for transmission of PDCCH in the PDCCH monitoring occasions of a search space. For PDSCH, TCI state of scheduling PDCCH can be used for scheduled PDSCH. Alternately, TCI state of the PDCCH for the lowest corset ID in the slot is used for PDSCH. Alternately combination of RRC+MAC CE+DCI is used to indicate the TCI state for PDSCH. RRC configures a list of TCI state, MAC CE indicates a subset of these TCI states and DCI indicates one of the TCI states from the list of TCI states indicated in MAC CE.

Bandwidth adaptation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a bandwidth part (BWP). BA is achieved by configuring RRC connected UE with BWP(s) and telling the UE which of the configured BWPs is currently the active one. When BA is configured, the UE only has to monitor PDCCH on the one active BWP i.e., the UE may not need to monitor PDCCH on the entire DL frequency of the serving cell.

In an RRC connected state, a UE is configured with one or more DL and UL BWPs, for each configured serving cell (i.e., PCell or SCell). For an activated serving cell, there is always one active UL and DL BWP at any point in time. The BWP switching for a serving cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of random access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a serving cell is indicated by either RRC or PDCCH. For unpaired spectrum, a DL BWP is paired with a UL BWP, and BWP switching is common for both UL and DL. Upon expiry of BWP inactivity timer a UE switched to the active DL BWP to the default DL BWP or initial DL BWP (if default DL BWP is not configured).

A random access in fifth generation wireless communication system: in the 5G wireless communication system, random access (RA) is supported. random access (RA) is used to achieve uplink (UL) time synchronization. RA is used during initial access, handover, radio resource control (RRC) connection re-establishment procedure, scheduling request transmission, SCG addition/modification, beam failure recovery and data or control information transmission in UL by a non-synchronized UE in an RRC CONNECTED state. Several types of random access procedure is supported.

Contention based random access (CBRA): This is also referred as 4 step CBRA. In this type of random access, a UE first transmits random access preamble (also referred as Msg1) and then waits for random access response (RAR) in the RAR window. RAR is also referred as Msg2. Next generation node B (gNB) transmits the RAR on PDSCH. PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by a gNB. The RA-RNTI is calculated as follows: RA-RNTI=1+s_id+14*t_id+14*80*f_id+14*80*8*ul_carrier_id, where s_id is the index of the first OFDM symbol of the PRACH occasion where the UE has transmitted Msg1, i.e., RA preamble; $0 \le s\_id < 14$; t_id is the index of the first slot of the PRACH occasion ($0 \le t\_id < 80$); f_id is the index of the PRACH occasion within the slot in the frequency domain ($0 \le f\_id < 8$), and ul_carrier_id is the UL carrier used for Msg1 transmission (0 for normal UL (NUL) carrier and 1 for supplementary UL (SUL) carrier. Several RARs for various random access preambles detected by the gNB can be multiplexed in the same RAR MAC protocol data unit (PDU) by the gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and the UE has not yet transmitted the RA preamble for a configurable (configured by the gNB in RACH configuration) number of times, the UE goes back to first step i.e., select random access resource (preamble/RACH occasion) and transmits the RA preamble. A backoff may be applied before going back to first step.

If the RAR corresponding to its RA preamble transmission is received the UE transmits a message 3 (Msg3) in UL grant received in RAR. Msg3 includes a message such as RRC connection request, RRC connection re-establishment request, RRC handover confirm, scheduling request, system information (SI) request etc. The Msg3 may include the UE identity (i.e., cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a PDCCH addressed to C-RNTI included in Msg3, contention resolution is considered successful, contention resolution timer is stopped and RA procedure is completed. While the contention resolution timer is running, if the UE receives contention resolution MAC CE including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and the UE has not yet transmitted the RA preamble for a configurable number of times, the UE goes back to first step i.e., select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for SCell, etc. Evolved node B (eNB) assigns to a UE dedicated random access preamble. A UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RAPID of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and the UE has not yet transmitted the RA preamble for a configurable (configured by a gNB in RACH configuration) number of times, the UE retransmits the RA preamble.

For certain events such has handover and beam failure recovery if dedicated preamble(s) are assigned to the UE, during first step of random access i.e., during random access resource selection for Msg1 transmission the UE determines whether to transmit dedicated preamble or non-dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e., dedicated preambles/ROs) are provided by the gNB, the UE selects non dedicated preamble. Otherwise, the UE selects dedicated preamble. So, during the RA procedure, one random access attempt can be CFRA while other random access attempt can be CBRA.

2 step contention based random access (2 step CBRA): in the first step, a UE transmits random access preamble on PRACH and a payload (i.e., MAC PDU) on PUSCH. The random access preamble and payload transmission is also referred as MsgA. In the second step, after MsgA transmission, the UE monitors for a response from the network (i.e., a gNB) within a configured window. The response is also referred as MsgB. GNB transmits the MsgB on PDSCH. PDCCH scheduling the PDSCH carrying MsgB is addressed to MsgB-radio network temporary identifier (MSGB-RNTI). MSGB-RNTI identifies the time-frequency resource (also referred as PRACH occasion or PRACH TX occasion or RACH occasion) in which RA preamble was detected by a gNB. The MSGB-RNTI is calculated as follows: RA-RNTI=1+s_id+14*t_id+14*80*f_id+14*80*8*ul_carrier_id+14*80*8*2, where s_id is the index of the first orthogonal frequency division multiplexing (OFDM) symbol of the PRACH occasion where the UE has transmitted Msg1, i.e., RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for NUL carrier and 1 for SUL carrier.

If CCCH SDU was transmitted in MsgA payload, a UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if the UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, the UE transmits Msg3 and performs contention resolution using Msg4 as in CBRA procedure. If contention resolution is successful, random access procedure is considered successfully completed. If contention resolution fails upon fallback (i.e., upon transmitting Msg3), the UE retransmits MsgA. If configured window in which the UE monitor network response after transmitting MsgA expires and the UE has not received MsgB including contention resolution information or fallback information as explained above, the UE retransmits MsgA. If the random access procedure is not successfully completed even after transmitting the msgA configurable number of times, the UE fallbacks to 4 step RACH procedure i.e., the UE only transmits the PRACH preamble.

MsgA payload may include one or more of CCCH SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include a UE ID (e.g., random ID, S-TMSI, C-RNTI, resume ID, etc.) along with preamble in first step. The UE ID may be included in the MAC PDU of the MsgA. The UE ID such as C-RNTI may be carried in MAC CE wherein MAC CE is included in MAC PDU. Other UE IDs (e.g., random ID, S-TMSI, C-RNTI, resume ID, etc.) may be carried in CCCH SDU.

The UE ID can be one of random ID, S-TMSI, C-RNTI, resume ID, IMSI, idle mode ID, inactive mode ID, etc. The UE ID can be different in different scenarios in which a UE performs the RA procedure. When UE performs RA after power on (before the UE is attached to the network), then UE ID is the random ID. When the UE perform RA in an IDLE state after the UE is attached to network, the UE ID is S-TMSI. If UE has an assigned C-RNTI (e.g., in a connected state), the UE ID is C-RNTI. In case the UE is in an INACTIVE state, the UE ID is a resume ID. In addition to the UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case, a gNB assigns to UE dedicated random access preamble (s) and PUSCH resource(s) for MsgA transmission. RO(s) to be used for preamble transmission may also be indicated. In the first step, the UE transmits random access preamble on PRACH and a payload on PUSCH using the contention free random access resources (i.e., dedicated preamble/PUSCH resource/RO). In the second step, after MsgA transmission, the UE monitors for a response from the network (i.e., a gNB) within a configured window. The response is also referred as MsgB.

A gNB transmits the MsgB on PDSCH. PDCCH scheduling the PDSCH carrying MsgB is addressed to MSGB-RNTI. MSGB-RNTI identifies the time-frequency resource (also referred as PRACH occasion or PRACH TX occasion or RACH occasion) in which RA preamble was detected by a gNB. The MSGB-RNTI is calculated as follows: RA-RNTI=1+s_id+14*t_id+14*80*f_id+14*80*8*ul_carrier_id+14*80*8*2, where s_id is the index of the first orthogonal frequency division multiplexing (OFDM) symbol of the PRACH occasion where the UE has transmitted Msg1, i.e., RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for NUL carrier and 1 for SUL carrier.

If a UE receives PDCCH addressed to C-RNTI, random access procedure is considered successfully completed. If the UE receives fallback information corresponding to its transmitted preamble, random access procedure is considered successfully completed.

For certain events such has handover and beam failure recovery if dedicated preamble(s) and PUSCH resource(s) are assigned to the UE, during first step of random access i.e., during random access resource selection for MsgA transmission the UE determines whether to transmit dedicated preamble or non-dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e., dedicated preambles/ROs/PUSCH resources) are provided by a gNB, the UE selects non dedicated preamble. Otherwise, the UE selects dedicated preamble. So, during the RA procedure, one random access attempt can be 2 step CFRA while other random access attempt can be 2 step CBRA.

Upon initiation of random access procedure, a UE first selects the carrier (SUL or NUL). If the carrier to use for the random access procedure is explicitly signaled by a gNB, the UE selects the signaled carrier for performing random access procedure. If the carrier to use for the random access procedure is not explicitly signaled by the gNB; and if the serving cell for the random access procedure is configured with supplementary uplink and if the RSRP of the downlink pathloss reference is less than rsrp-ThresholdSSB-SUL: the UE selects the SUL carrier for performing random access procedure. Otherwise, the UE selects the NUL carrier for performing random access procedure. Upon selecting the UL carrier, the UE determines the UL and DL BWP for random access procedure. The UE then determines whether to perform 2 step or 4 step RACH for this random access procedure.

If this random access procedure is initiated by PDCCH order and if the ra-PreambleIndex explicitly provided by PDCCH is not 0b000000, the UE selects 4 step RACH.

else if 2 step contention free random access resources are signaled by the gNB for this random access procedure, the UE selects 2 step RACH.

else if 4 step contention free random access resources are signaled by the gNB for this random access procedure, the UE selects 4 step RACH.

else if the UL BWP selected for this random access procedure is configured with only 2 step RACH resources, the UE selects 2 step RACH.

else if the UL BWP selected for this random access procedure is configured with only 4 step RACH resources, the UE selects 4 step RACH.

else if the UL BWP selected for this random access procedure is configured with both 2 step and 4 step RACH resources, if RSRP of the downlink pathloss reference is below a configured threshold, the UE selects 4 step RACH. Otherwise the UE selects 2 step RACH.

Paging in fifth generation wireless communication system: In the $5^{th}$ generation (also referred as NR or New Radio) wireless communication system the UE can be in one of the following RRC state: RRC IDLE, RRC INACTIVE and RRC CONNECTED. The RRC states can further be characterized as follows:

In an RRC_IDLE state, a UE specific discontinuous reception (DRX) may be configured by upper layers (i.e., non-access stratum (NAS)). The UE: monitors short messages transmitted with paging RNTI (P-RNTI) over DCI; monitors a paging channel for CN paging using 5G-S-TMSI; performs neighbouring cell measurements and cell (re-)selection; and acquires system information and can send SI request (if configured).

In an RRC_INACTIVE state, a UE specific DRX may be configured by upper layers or by RRC layer; In this state, the UE stores the UE Inactive AS context. A RAN-based notification area is configured by RRC layer. The UE monitors short messages transmitted with P-RNTI over DCI; monitors a paging channel for CN paging using 5G-S-TMSI and RAN paging using full I-RNTI; performs neighbouring cell measurements and cell (re-)selection; performs RAN-based notification area updates (RNAU) periodically and when moving outside the configured RAN-based notification area; acquires system information and can send SI request (if configured).

In the RRC_CONNECTED, the UE stores the AS context. Unicast data is transmitted/received to/from the UE. At lower layers, the UE may be configured with a UE specific DRX. The UE: monitors short messages transmitted with P-RNTI over DCI, if configured; monitors control channels associated with the shared data channel to determine if data is scheduled for it; provides channel quality and feedback information; performs neighbouring cell measurements and measurement reporting; and acquires system information.

The 5G or next generation radio access network (NG-RAN) based on NR consists of NG-RAN nodes where NG-RAN node is a gNB, providing NR user plane and control plane protocol terminations towards the UE. The gNBs are also connected by means of the NG interfaces to the 5GC, more specifically to the access and mobility management function (AMF) by means of the NG-C interface and to the user plane function (UPF) by means of the NG-U interface. In the $5^{th}$ generation (also referred as NR or new radio) wireless communication system, the UE may use DRX in an RRC_IDLE and an RRC_INACTIVE states in order to reduce power consumption. In the RRC_IDLE/ RRC_INACTIVE states, a UE wakes up at regular intervals (i.e., every DRX cycle) for short periods to receive paging, to receive SI update notification and to receive emergency notifications.

A paging message is transmitted using PDSCH. PDCCH is addressed to P-RNTI if there is a paging message in PDSCH. P-RNTI is common for all UEs. UE identity (i.e., S-TMSI for RRC_IDLE UE or I-RNTI for RRC_INACTIVE UE) is included in the paging message to indicate paging for a specific UE. The paging message may include multiple UE identities to page multiple UEs. The paging message is broadcasted (i.e., PDCCH is masked with P-RNTI) over data channel (i.e., PDSCH). SI update and emergency notifications are included in DCI and PDCCH carrying this DCI is addressed to P-RNTI. In the RRC idle/inactive mode, the UE monitors one PO every DRX cycle. In the RRC idle/inactive mode, the UE monitors PO in initial DL BWP. In an RRC connected state, the UE monitors one or more Pos to receive SI update notification and to receive emergency notifications. In an RRC connected state, a UE can monitor any PO in paging DRX cycle and monitors at least one PO in SI modification period. In the RRC idle/inactive mode, the UE monitors PO every DRX cycle in its active DL BWP. A PO is a set of "S" PDCCH monitoring occasions for paging, where "S" is the number of transmitted SSBs (i.e., the SSB consists of primary synchronization signal (PSS) and secondary synchronization signal (SSS) and physical broadcast channel (PBCH)) in cell. A UE first determines the paging frame (PF) and then determines the PO with respect to the determined PF. One PF is a radio frame (10 ms).

The PF for a UE is the radio frame with system frame number "SFN" which satisfies the equation (SFN+ PF_offset) mod T=(T div N)*(UE_ID mod N).

Index (i_s), indicating the index of the PO is determined by i_s=floor (UE_ID/N) mod Ns.

T is DRX cycle of the UE.

In an RRC_INACTIVE state, T is determined by the shortest of the UE specific DRX value configured by RRC, UE specific DRX value configured by NAS, and a default DRX value broadcast in system information.

In an RRC_IDLE state, T is determined by the shortest of UE specific DRX value configured by NAS, and a default DRX value broadcast in system information. If UE specific DRX is not configured by upper layers (i.e., NAS), the default value is applied.

N: number of total paging frames in T.

Ns: number of paging occasions for a PF.

PF_offset: offset used for PF determination.

UE_ID: 5G-S-TMSI mod 1024.

Parameters Ns, nAndPagingFrameOffset, and the length of default DRX Cycle are signaled in SIBI. The values of N and PF_offset are derived from the parameter nAndPagingFrameOffset. If the UE has no 5G-S-TMSI, for instance when the UE has not yet registered onto the network, the UE may use as default identity UE_ID=0 in the PF and i_s formulas above.

The PDCCH monitoring occasions for paging are determined based on paging search space configuration (paging-SearchSpace) signaled by the gNB.

When SearchSpaceId=0 is configured for paging-SearchSpace, the PDCCH monitoring occasions for paging are same as for RMSI. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. The PDCCH monitoring occasions for paging are determined based on paging search space configuration (paging-SearchSpace) signaled by the gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO) for each PO corresponding to a PF. When firstPDCCH-MonitoringOccasionOfPO) is signalled, the $(i\_s+1)^{th}$ PO is a set of "S" consecutive PDCCH monitoring occasions for paging starting from the PDCCH monitoring occasion number indicated by firstPDCCH-MonitoringOccasionOfPO) (i.e., the $(i\_s+1)^{th}$ value of the firstPDCCH-MonitoringOccasionOfPO parameter). Otherwise, the $(i\_s+1)^{th}$ PO is a set of "S" consecutive PDCCH monitoring occasions for paging starting from the $(i\_s*S)^{th}$ PDCCH monitoring occasion for paging. "S" is the number of actual transmitted SSBs determined according to parameter ssb-PositionsInBurst signalled in SystemInformationBlock1 received from the gNB. The parameter firstPDCCH-MonitoringOccasionOfPO) is signaled in SIBI for paging in initial DL BWP. For paging in a DL BWP other than the initial DL BWP, the parameter first-PDCCH-MonitoringOccasionOfPO) is signaled in the corresponding BWP configuration.

Radio link failure (RLF) handling in 5G wireless communication system: a UE is configured with radio link monitoring reference signal (RLM-RS) resources (s). On each RLM-RS resource, the UE estimates the downlink radio link quality and compare the quality to the thresholds $Q_{out}$ and $Q_{in}$. Here, $Q_{out}$ is a level at which the downlink radio link cannot be reliably received and corresponds to the out-of-sync block error rate ($BLER_{out}$). $Q_{in}$ is a level at which the downlink radio link quality can be received with higher reliability and correspond to the in-sync block error rate ($BLER_{in}$). $BLER_{out}$ and $BLER_{in}$ are signalled. An out of sync indication occurs when downlink radio link quality on all the configured RLM-RS resources is worse than $Q_{out}$. In sync indication occurs when downlink radio link quality on at least one of the configured RLM-RS resources is better than $Q_{in}$. Upon receiving N310 consecutive "out-of-sync" indications for the SpCell from lower layers while neither T300, T301, T304, T311, T316 nor T319 are running: the UE starts timer T310 for the corresponding SpCell. Upon receiving N311 consecutive "in-sync" indications for the SpCell from lower layers while T310 is running, the UE may: stop timer T310 for the corresponding SpCell. When T310 expires, the UE declares RLF.

Here, for network energy savings, cell discontinuous transmission (DTX) and/or cell DRX can be configured. In detail:
  periodic cell DTX/DRX pattern is configured by a UE-specific RRC signalling message. and
  cell DTX and cell DRX modes can be configured and operated separately (e.g., one RRC configuration set for DL and the other set for UL).

If T310 is running during network DTX duration, RLF may be declared unnecessarily as there is no chance to receive "in-sync" indications. Assumption is that RLM RSs are not transmitted during DTX duration. Thus, an enhanced method of handling RLF in a cell supporting network energy saving (NES) is needed.

[Method 1]

FIG. 1, FIG. 2, FIG. 3, and FIG. 4 illustrate examples of RLF handling for a cell supporting network energy saving in accordance with an embodiment of the present disclosure.

A UE is in an RRC_CONNECTED state. A periodic cell DTX pattern may be configured for a cell (cell can be an SpCell (110, 210, 310, 410)). The periodic cell DTX pattern may be configured by a "duration" and "period" field wherein during the "duration" interval which occurs periodically every "period," a cell (i.e., a base station supporting the cell) does not perform transmission (or stops certain transmissions (e.g., PDSCH, PBCH, SSBs, etc.) and during the interval "period-duration" cell (i.e., a base station supporting the cell) perform transmission. Alternately, periodic cell DTX pattern may be configured by a "duration" and "period" field wherein during the "duration" interval which occurs periodically every "period," a cell (i.e., a base station supporting the cell) perform transmission and during the interval "period-duration" cell does not perform transmission (or stops certain transmissions (e.g., PDSCH, PBCH, SSBs, etc.)).

A periodic cell DRX pattern may be configured by a "duration" and "period" field wherein during the "duration" interval which occurs periodically every "period," a cell (i.e., a base station supporting the cell) does not perform reception (or stops certain receptions e.g., PUCCH, PUSCH, PRACH etc) and during the interval "period-duration" cell (i.e., a base station supporting the cell) perform transmission. Alternately, periodic cell DRX pattern may be configured by a "duration" and "period" field wherein during the "duration" interval which occurs periodically every "period," a cell (i.e., a base station supporting the cell) perform reception and during the interval "period-duration" cell does not perform transmission (or stops certain transmissions (e.g., PDSCH, PBCH, SSBs, etc.)). During the cell level DRX duration where network (i.e., base station) does not receive transmission (or certain transmissions) from the UE on the uplink of that cell, the UE does not transmit (or does not transmit) certain transmissions in uplink of that cell. In an embodiment, network DTX duration in above description can be the cell level inactive duration where cell does not transmit any transmission to the UE or does not transmit any dedicated transmission to the UE or does not transmit certain transmissions (e.g., PDSCH, PBCH, etc.) to the UE. The above configuration can be configured for SpCell or one or more serving cells.

A UE is configured with RLM-RS resources (s) for the SpCell (120, 220, 320, 420). On each RLM-RS resource, the UE estimates the downlink radio link quality and compare the quality to the thresholds $Q_{out}$ and $Q_{in}$ (130, 230, 330, 430). Here, $Q_{out}$ is a level at which the downlink radio link cannot be reliably received and corresponds to the out-of-sync block error rate ($BLER_{out}$). And $Q_{in}$ is a level at which the downlink radio link quality can be received with higher reliability and correspond to the in-sync block error rate ($BLER_{in}$). $BLER_{out}$ and $BLER_{in}$ are signaled. Out of sync indication occurs when downlink radio link quality on all the configured RLM-RS resources is worse than $Q_{out}$. In sync indication occurs when downlink radio link quality on at least one of the configured RLM-RS resources is better than $Q_{in}$ (140, 240, 340, 440). Upon receiving N310 consecutive "out-of-sync" indications for the SpCell from lower layers while neither T300, T301, T304, T311, T316 nor T319 are running: the UE starts timer T310 for the corresponding SpCell (150, 250, 350, 450). Upon receiving N311 consecutive "in-sync" indications for the SpCell from lower layers while T310 is running, the UE may: stop timer T310 for the corresponding SpCell.

If T312 is configured in MCG: the UE start T312 upon triggering a measurement report for a measurement identity for which T312 has been configured and use T312 configuration information has been set to true, while T310 in PCell is running. If T312 is configured in SCG and use T312 configuration information has been set to true: the UE start T312 upon triggering a measurement report for a measurement identity for which T312 has been configured, while T310 in PSCell is running. T312 is stopped, upon receiving N311 consecutive in-sync indications from lower layers for the SpCell, receiving RRCReconfiguration with reconfiguration WithSync for that cell group, upon reception of MobilityFromNRCommand, upon initiating the connection re-establishment procedure, upon the reconfiguration of rlf-TimersAndConstant, upon initiating the MCG failure information procedure, upon conditional reconfiguration execution i.e., when applying a stored RRCReconfiguration message including reconfiguration WithSync for that cell group, and upon the expiry of T310 in corresponding SpCell; Upon SCG release, if the T312 is kept in SCG.

In an embodiment of this disclosure, the UE stops timer T310 (if running) at the start of cell DTX duration (or in other words when the UE enters cell DTX duration) of SpCell. An example of this embodiment is shown in FIG. 1. An indication can be included in an RRC configuration message to determine whether the UE performs this operation or not. The indication can be common or per cell DTX configuration (160).

Figure 2:
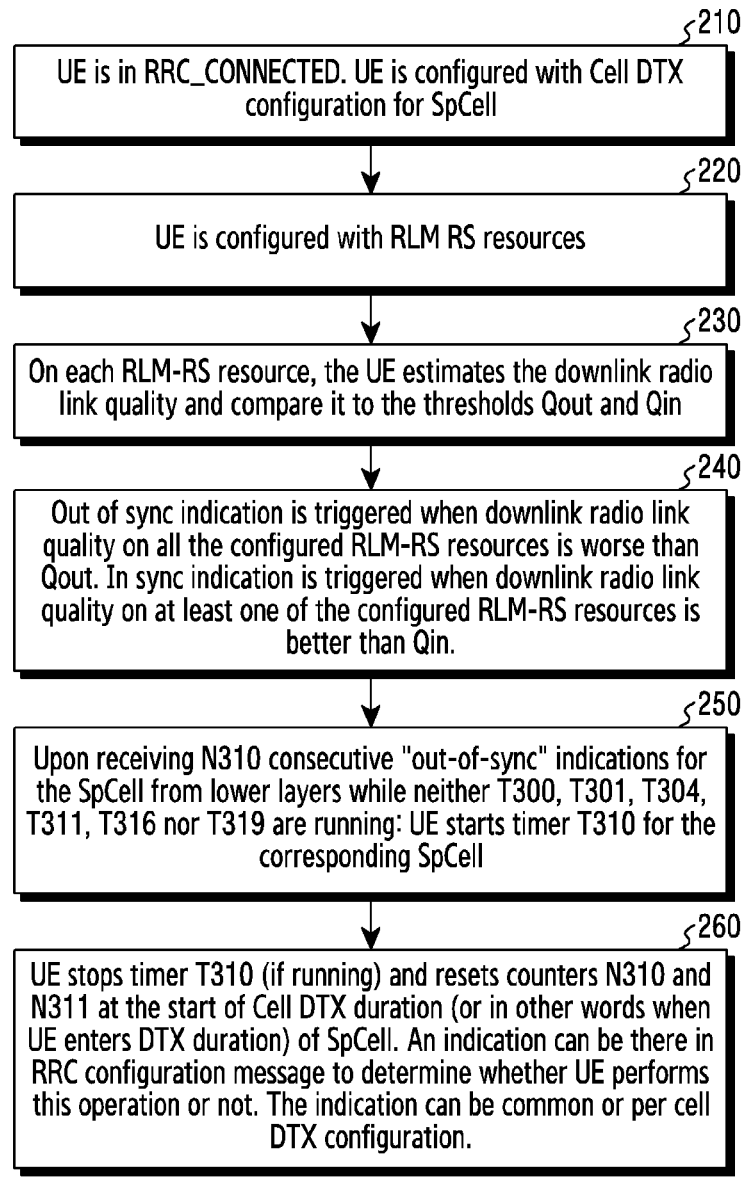
FIG. 2 illustrates another example of RLF handling for a cell supporting network energy saving in accordance with an embodiment of the present disclosure.

In another embodiment of this disclosure, the UE stops timer T310 (if running) and resets counters N310 and N311, at the start of cell DTX duration (or, in other words when the UE enters cell DTX duration) of SpCell. An example of this embodiment is shown in FIG. 2. An indication can be included in an RRC configuration message to determine whether the UE performs this operation or not. The indication can be common or per cell DTX configuration (260).

Figure 3:
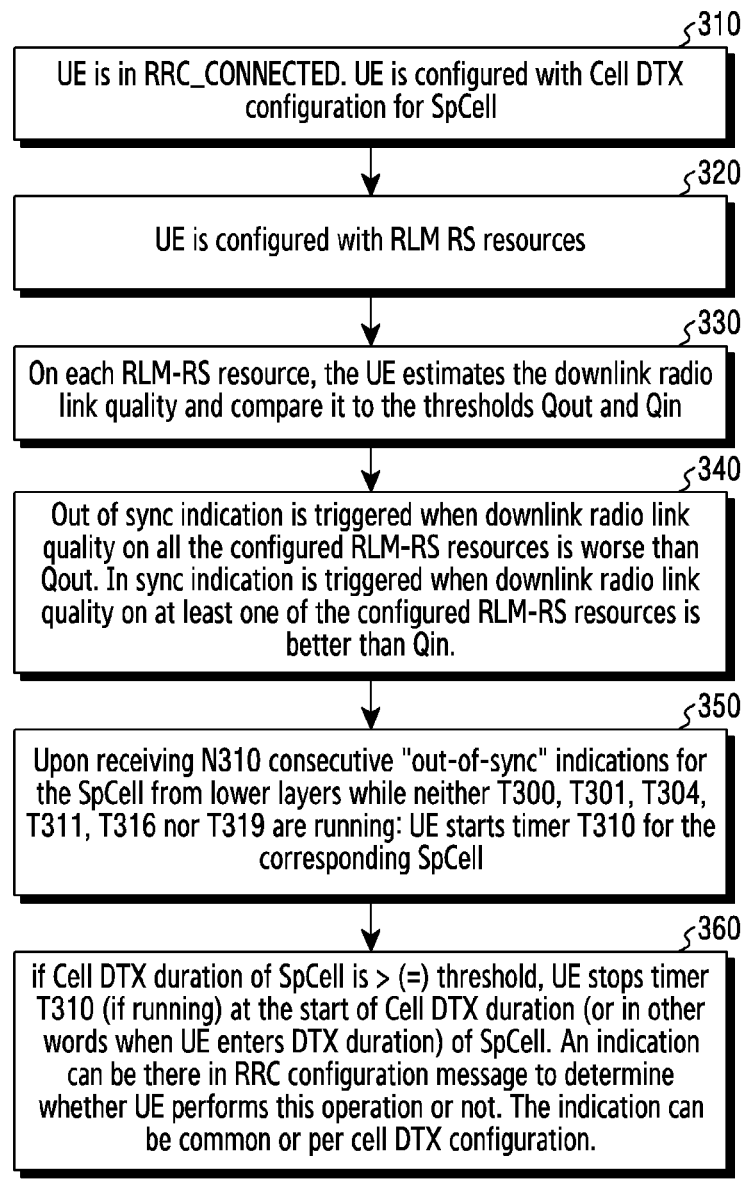
FIG. 3 illustrates yet another example of RLF handling for a cell supporting network energy saving in accordance with an embodiment of the present disclosure.

In another embodiment of this disclosure, if a cell DTX duration of SpCell is larger than or equal to =a threshold or is larger than a threshold, the UE stops timer T310 (if running) at the start of cell DTX duration (or in other words when the UE enters cell DTX duration) of SpCell. An example of this embodiment is shown in FIG. 3. An indication can be included in an RRC configuration message to determine whether the UE performs this operation or not. The indication can be common or per cell DTX configuration (360). The threshold can be signaled by a gNB in an RRC message or system information. The threshold can be per cell group or per cell or per BWP.

Figure 4:
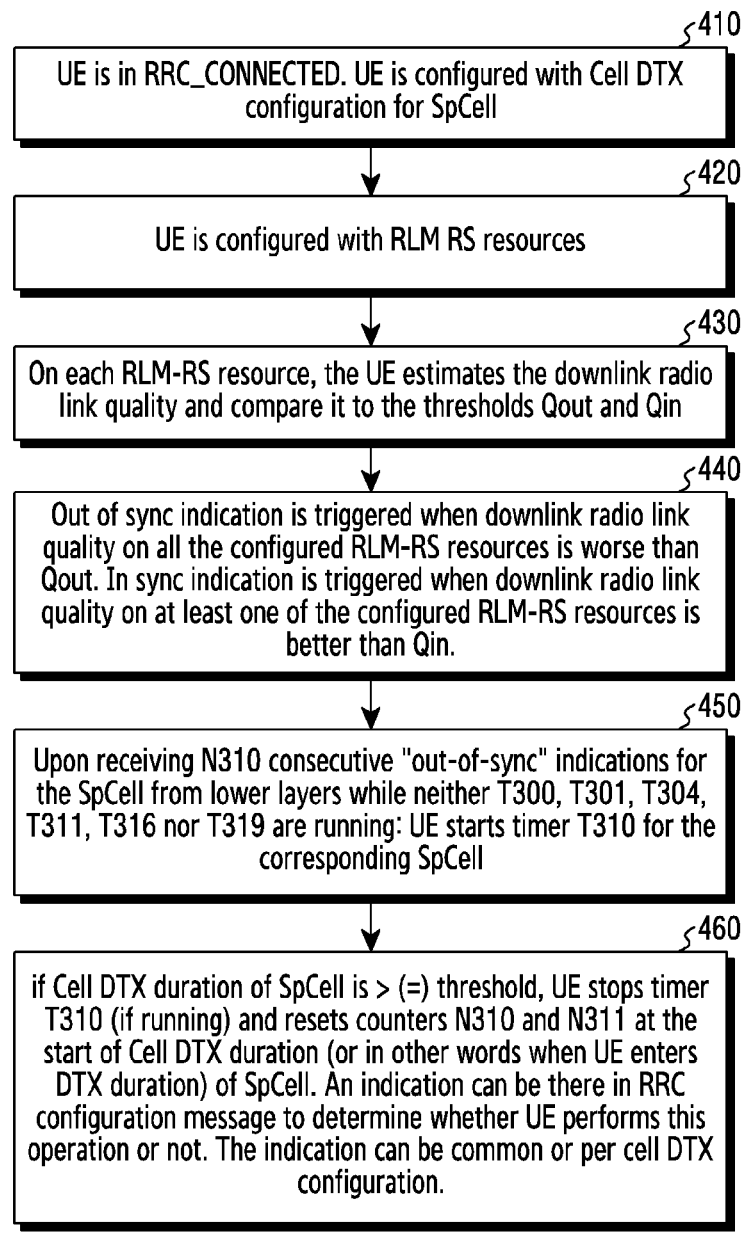
FIG. 4 illustrates yet another example of RLF handling for a cell supporting network energy saving in accordance with an embodiment of the present disclosure.

In another embodiment of this disclosure, if cell DTX duration of SpCell is larger than or equal to a threshold or is larger than a threshold, the UE stops timer T310 (if running) and resets counters N310 and N311 at the start of cell DTX duration (or in other words when the UE enters cell DTX duration) of SpCell. An example of this embodiment is shown in FIG. 4. An indication can be included in an RRC configuration message to determine whether the UE performs this operation or not. The indication can be common or per cell DTX configuration (460). The threshold can be signaled by a gNB in an RRC message or system information. The threshold can be per cell group or per cell or per BWP.

In another embodiment of this disclosure, the UE stops timer T312 (if running) at the start of cell DTX duration (or in other words when the UE enters cell DTX duration) of SpCell. An indication can be included in an RRC configuration message to determine whether the UE performs this operation or not. The indication can be common or per cell DTX configuration.

In another embodiment of this disclosure, if cell DTX duration of SpCell is larger than or equal to a threshold or is larger than a threshold, the UE stops timer T312 (if running) at the start of cell DTX duration (or in other words when the UE enters cell DTX duration) of SpCell. An indication can be included in an RRC configuration message to determine whether the UE performs this operation or not. The indication can be common or per cell DTX configuration. The threshold can be signaled by a gNB in an RRC message or system information. The threshold can be per cell group or per cell or per BWP.

In the above description, it is assumed that during cell DTX duration, RLM RSS (i.e., SSBs/CSI RSs etc.) are not transmitted from a cell/SpCell (or a base station supporting the cell/SpCell).

[Method 2]

FIG. 5, FIG. 6, FIG. 7, and FIG. 8 illustrate examples of RLF handling for a cell supporting network energy saving in accordance with an embodiment of the present disclosure.

A UE is in an RRC_CONNECTED state. A periodic cell DTX pattern may be configured for an SpCell (510, 610, 710, 810). The periodic cell DTX pattern may be configured by a "duration" and "period" field wherein during the "duration" interval which occurs periodically every "period," a cell (i.e., a base station supporting the cell) does not perform transmission (or stops certain transmissions (e.g., PDSCH, PBCH, SSBs, etc.) and during the interval "period-duration" cell (i.e., a base station supporting the cell) perform transmission. Alternately, periodic cell DTX pattern may be configured by a "duration" and "period" field wherein during the "duration" interval which occurs periodically every "period," a cell (i.e., a base station supporting the cell) perform transmission and during the interval "period-duration" cell does not perform transmission (or stops certain transmissions (e.g., PDSCH, PBCH, SSBs, etc.)).

A periodic cell DRX pattern may be configured by a "duration" and "period" field wherein during the "duration" interval which occurs periodically every "period," a cell (i.e., a base station supporting the cell) does not perform reception (or stops certain receptions e.g., PUCCH, PUSCH, PRACH etc.) and during the interval "period-duration" cell (i.e., a base station supporting the cell) perform transmission. Alternately, periodic cell DRX pattern may be configured by a "duration" and "period" field wherein during the "duration" interval which occurs periodically every "period," a cell (i.e., a base station supporting the cell) perform reception and during the interval "period-duration" cell does not perform transmission (or stops certain transmissions (e.g., PDSCH, PBCH, SSBs, etc.)). During the cell level DRX duration where network (i.e., base station) does not receive transmission (or certain transmissions) from the UE on the uplink of that cell, the UE does not transmit (or does not transmit) certain transmissions in uplink of that cell. In an embodiment, network DTX duration in above description can be the cell level inactive duration where cell does not transmit any transmission to the UE or does not transmit any dedicated transmission to the UE or does not transmit certain transmissions (e.g., PDSCH, PBCH, etc.) to the UE. The above configuration can be configured for SpCell or one or more serving cells.

A UE is configured with RLM-RS resources (s) for the SpCell (520, 620, 720, 820). On each RLM-RS resource, the UE estimates the downlink radio link quality and compare the quality to the thresholds $Q_{out}$ and $Q_{in}$ (530, 630, 730, 830). Here, $Q_{out}$ is a level at which the downlink radio link cannot be reliably received and corresponds to the out-of-sync block error rate ($BLER_{out}$). And $Q_{in}$ is a level at which the downlink radio link quality can be received with higher reliability and correspond to the in-sync block error rate ($BLER_{in}$). $BLER_{out}$ and $BLER_{in}$ are signaled. Out of sync indication occurs when downlink radio link quality on all the configured RLM-RS resources is worse than $Q_{out}$. In sync indication occurs when downlink radio link quality on at least one of the configured RLM-RS resources is better than $Q_{in}$ (540, 640, 740, 840). Upon receiving N310 consecutive "out-of-sync" indications for the SpCell from lower layers while neither T300, T301, T304, T311, T316 nor T319 are running: the UE starts timer T310 for the corresponding SpCell (550, 650, 750, 850). Upon receiving N311 consecutive "in-sync" indications for the SpCell from lower layers while T310 is running, the UE may: stop timer T310 for the corresponding SpCell.

If T312 is configured in MCG: the UE starts T312 upon triggering a measurement report for a measurement identity for which T312 has been configured and use T312 configuration information has been set to true, while T310 in PCell is running. If T312 is configured in SCG and use T312 configuration information has been set to true: the UE start T312 upon triggering a measurement report for a measurement identity for which T312 has been configured, while T310 in PSCell is running. T312 is stopped, upon receiving N311 consecutive in-sync indications from lower layers for the SpCell, receiving RRCReconfiguration with reconfiguration WithSync for that cell group, upon reception of MobilityFromNRCommand, upon initiating the connection re-establishment procedure, upon the reconfiguration of rlf-TimersAndConstant, upon initiating the MCG failure information procedure, upon conditional reconfiguration execution i.e., when applying a stored RRCReconfiguration message including reconfiguration WithSync for that cell group, and upon the expiry of T310 in corresponding SpCell; Upon SCG release, if the T312 is kept in SCG.

Figure 5:
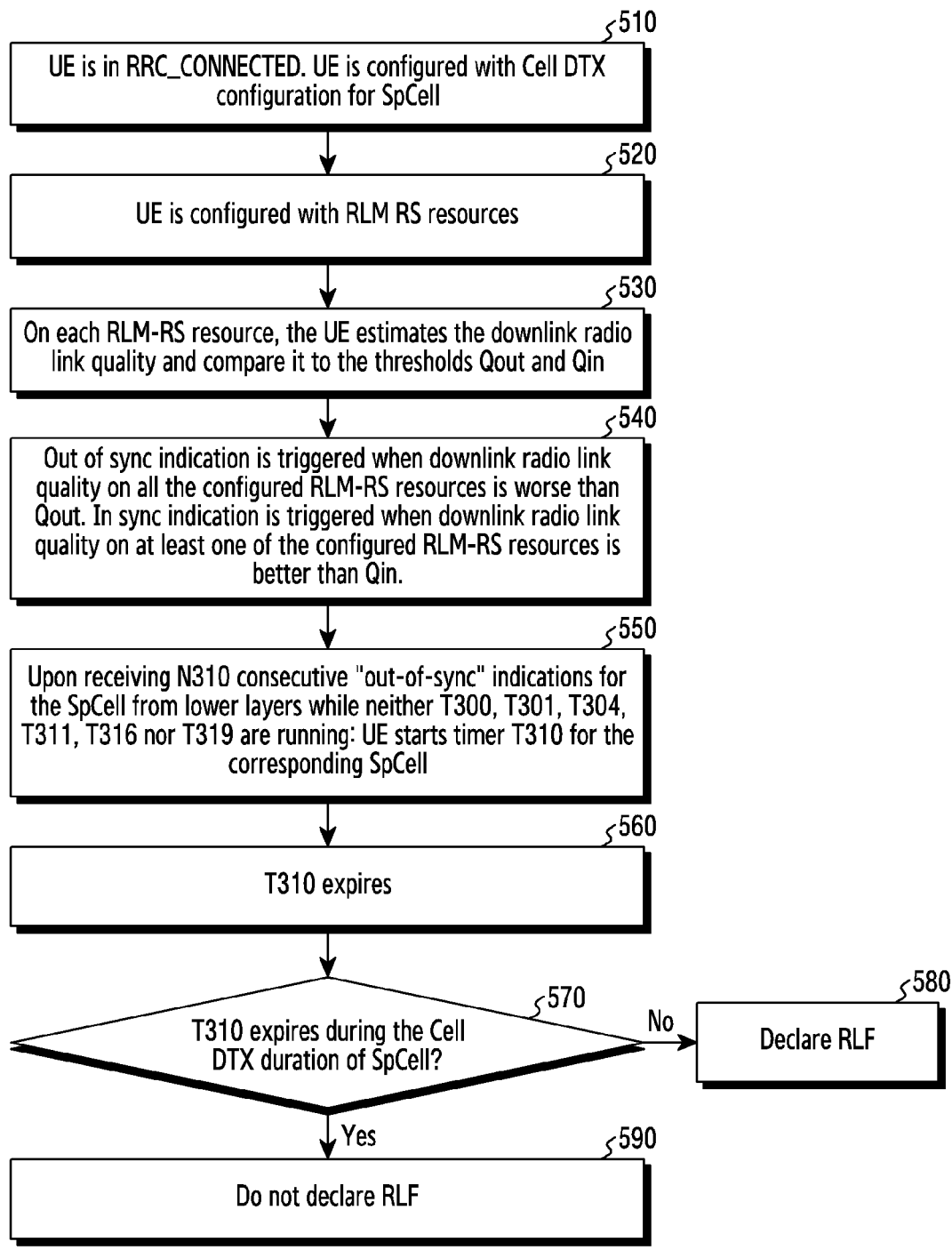
FIG. 5 illustrates yet another example of RLF handling for a cell supporting network energy saving in accordance with an embodiment of the present disclosure.

In an embodiment of this disclosure, if T310 expires during the cell DTX duration of SpCell (560, 570), the UE does not declare RLF (590). An example of this is shown in FIG. 5. When T310 expires, the UE checks if cell DTX is configured or not for SpCell (560, 570). If cell DTX is configured and T310 expires during the cell DTX duration of SpCell (560, 570), the UE does not declare RLF (590). If cell DTX is not configured for SpCell and T310 expires; or if cell DTX is configured for SpCell and T310 expires outside the cell DTX duration of SpCell (560, 570), the UE declares RLF (580). An indication can be included in an RRC configuration message to determine whether the UE performs this operation or not. The indication can be common or per cell DTX configuration.

Figure 6:
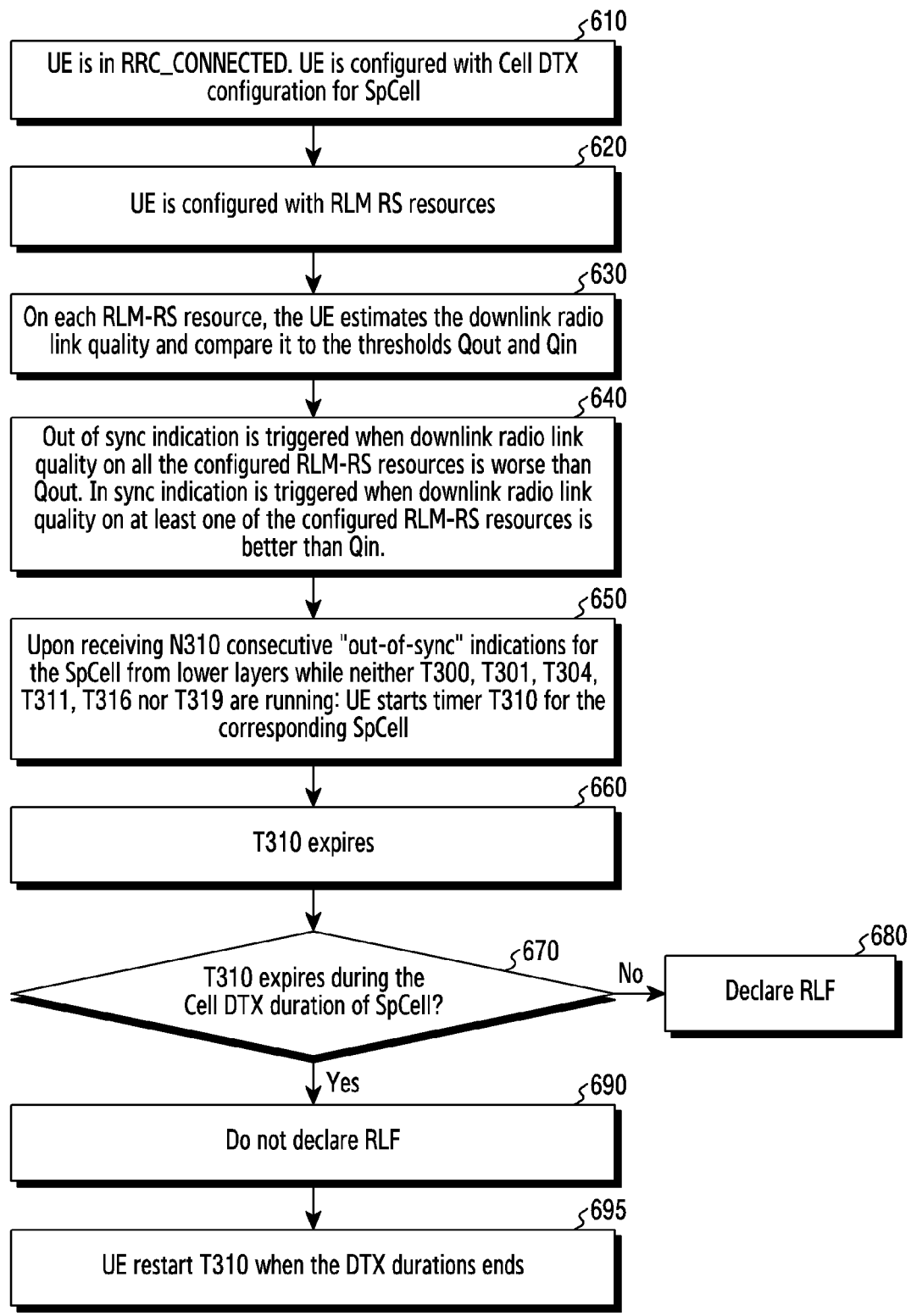
FIG. 6 illustrates yet another example of RLF handling for a cell supporting network energy saving in accordance with an embodiment of the present disclosure.

In another embodiment of this disclosure, if T310 expires during the cell DTX duration of SpCell (660, 670), the UE does not declare RLF (690) and the UE restarts T310 when the DTX durations ends (695). An example of this is shown in FIG. 6. When T310 expires, the UE checks if cell DTX is configured or not for SpCell (660, 670). If cell DTX is configured and T310 expires during the cell DTX duration of SpCell (660, 670), the UE does not declare RLF and the UE restarts T310 after the DRX duration ends (690, 695). If cell DTX is not configured for SpCell and T310 expires; or if cell DTX is configured for SpCell and T310 expires outside the cell DTX duration of SpCell (660, 670): the UE declares RLF (680). An indication can be included in an RRC configuration message to determine whether the UE performs this operation or not. The indication can be common or per cell DTX configuration.

Figure 7:
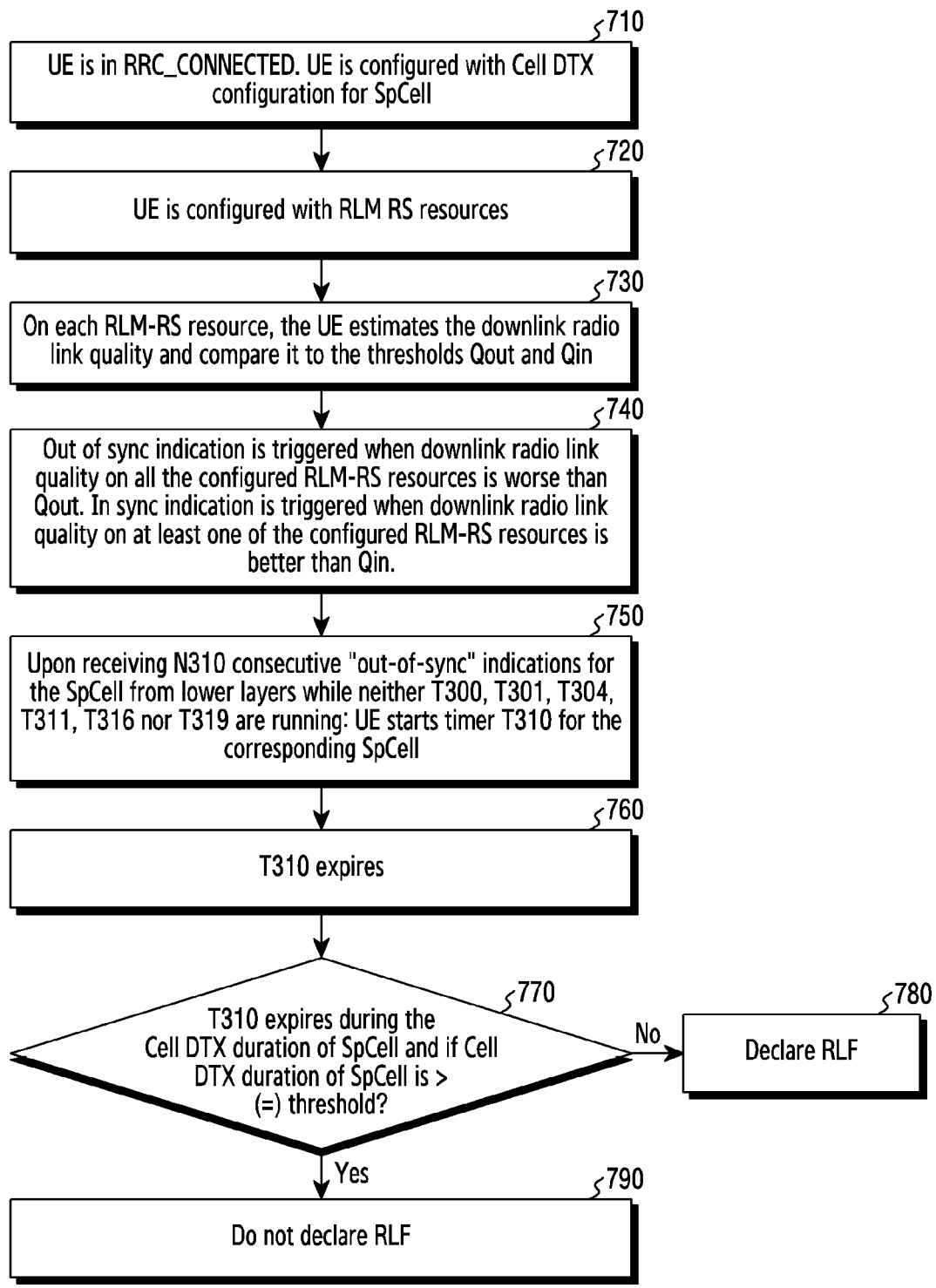
FIG. 7 illustrates yet another example of RLF handling for a cell supporting network energy saving in accordance with an embodiment of the present disclosure.

In another embodiment of this disclosure, if cell DTX duration of SpCell is larger than or equal to a threshold and if T310 expires during the cell DTX duration of SpCell (760, 770), the UE does not declare RLF (790). The threshold can be signaled by a gNB in an RRC message or system information. The threshold can be per cell group or per cell or per BWP. An example of this is shown in FIG. 7. When T310 expires, the UE checks if cell DTX is configured or not for SpCell (760, 770). If cell DTX is configured and T310 expires during the cell DTX duration of SpCell and if cell DTX duration of SpCell is larger than or equal to the threshold (760, 770), the UE does not declare RLF (790). If cell DTX is not configured for SpCell and T310 expires; or if cell DTX is configured for SpCell and T310 expires outside the cell DTX duration of SpCell; or if cell DTX duration of SpCell is smaller than or equal to the threshold and if T310 expires during the cell DTX duration of SpCell (760, 770): the UE declares RLF (780). An indication can be included in an RRC configuration message to determine whether the UE performs this operation or not. The indication can be common or per cell DTX configuration.

Figure 8:
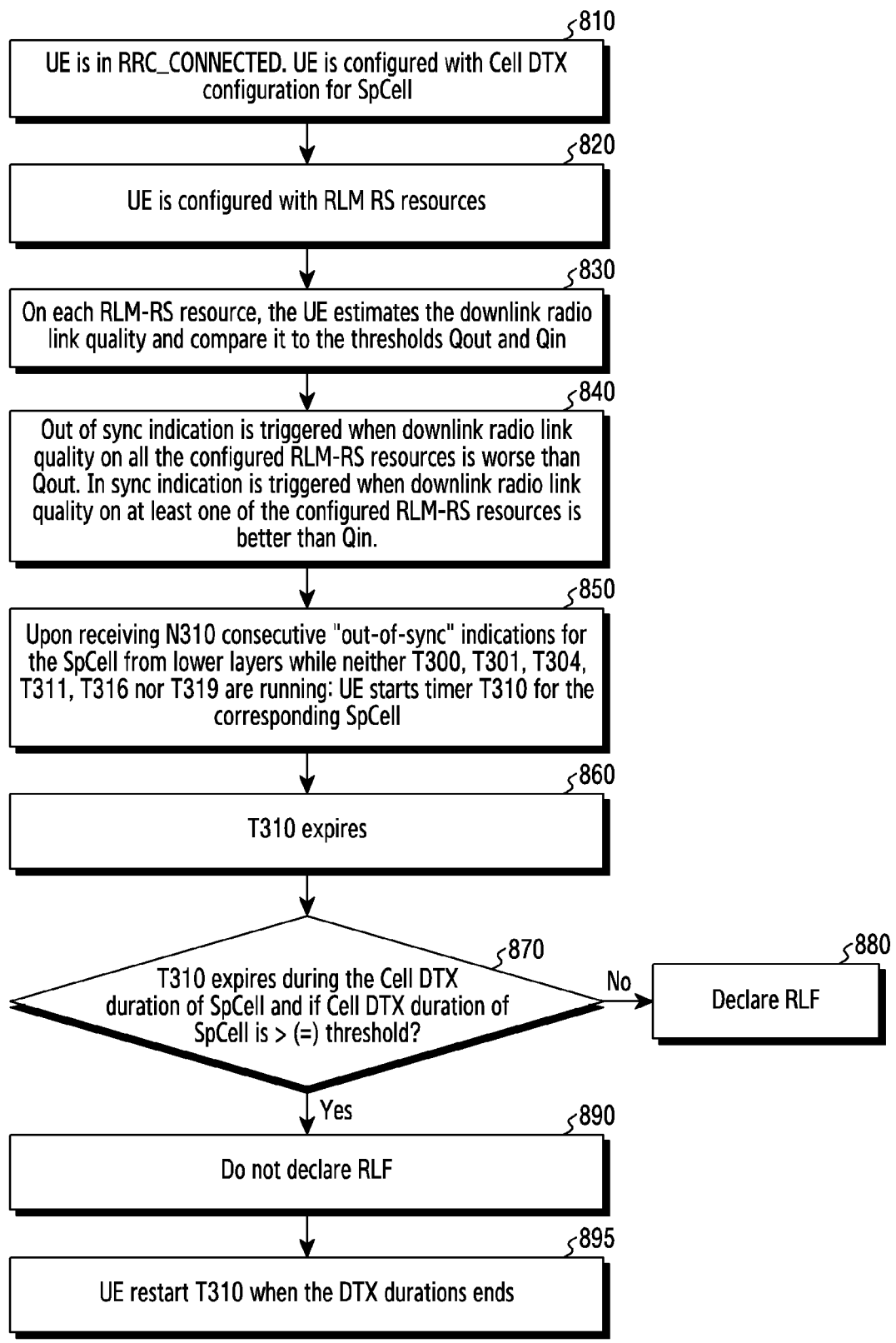
FIG. 8 illustrates yet another example of RLF handling for a cell supporting network energy saving in accordance with an embodiment of the present disclosure.

In another embodiment of this disclosure, if cell DTX duration of SpCell is larger than or equal to a threshold and if T310 expires during the cell DTX duration of SpCell (860, 870), the UE does not declare RLF and the UE restarts T310 when the DTX durations ends (880, 890). The threshold can be signaled by a gNB in an RRC message or system information. The threshold can be per cell group or per cell or per BWP. An example of this is shown in FIG. 8. When T310 expires, the UE checks if cell DTX is configured or not for SpCell (860, 870). If cell DTX is configured and T310 expires during the cell DTX duration of SpCell and if cell DTX duration of SpCell is larger than or equal to the threshold (860, 870), the UE does not declare RLF and the UE restarts T310 after the DRX duration ends (890, 895). If cell DTX is not configured for SpCell and T310 expires; or if cell DTX is configured for SpCell and T310 expires outside the cell DTX duration of SpCell; or if cell DTX duration of SpCell is smaller than or equal to the threshold and if T310 expires during the cell DTX duration of SpCell (860, 870): the UE declares RLF (880). An indication can be included in an RRC configuration message to determine whether the UE performs this operation or not. The indication can be common or per cell DTX configuration.

In another embodiment of this disclosure, if T312 expires during the cell DTX duration of SpCell, the UE does not declare RLF. When T312 expires, the UE checks if cell DTX is configured or not for SpCell. If cell DTX is configured and T312 expires during the cell DTX duration of SpCell, the UE does not declare RLF. If cell DTX is not configured for SpCell and T312 expires; or if cell DTX is configured for SpCell and T312 expires outside the cell DTX duration of SpCell, the UE declares RLF. An indication can be included in an RRC configuration message to determine whether the UE performs this operation or not. The indication can be common or per cell DTX configuration.

In another embodiment of this disclosure, if T312 expires during the cell DTX duration of SpCell, the UE does not declare RLF and the UE restarts T312 when the DTX durations ends. When T312 expires, the UE checks if cell DTX is configured or not for SpCell. If cell DTX is configured and T312 expires during the cell DTX duration of SpCell, the UE does not declare RLF and the UE restarts T312 after the DRX duration ends. If cell DTX is not configured for SpCell and T312 expires; or if cell DTX is configured for SpCell and T312 expires outside the cell DTX duration of SpCell: the UE declares RLF. An indication can be included in an RRC configuration message to determine whether the UE performs this operation or not. The indication can be common or per cell DTX configuration.

In another embodiment of this disclosure, if cell DTX duration of SpCell is larger than or equal to a threshold and if T312 expires during the cell DTX duration of SpCell, the UE does not declare RLF. The threshold can be signaled by a gNB in an RRC message or system information. The threshold can be per cell group or per cell or per BWP. When T312 expires, the UE checks if cell DTX is configured or not for SpCell. If cell DTX is configured and T312 expires during the cell DTX duration of SpCell and if cell DTX duration of SpCell is larger than or equal to the threshold, the UE does not declare RLF. If cell DTX is not configured for SpCell and T312 expires; or if cell DTX is configured for SpCell and T312 expires outside the cell DTX duration of SpCell; or if cell DTX duration of SpCell is smaller than or equal to the threshold and if T312 expires during the cell DTX duration of SpCell: the UE declares RLF. An indication can be included in an RRC configuration message to determine whether the UE performs this operation or not. The indication can be common or per cell DTX configuration.

In another embodiment of this disclosure, if cell DTX duration of SpCell is larger than or equal to a threshold and if T312 expires during the cell DTX duration of SpCell, the UE does not declare RLF and the UE restarts T312 when the DTX durations ends. The threshold can be signaled by a gNB in an RRC message or system information. The threshold can be per cell group or per cell or per BWP. When T312 expires, the UE checks if cell DTX is configured or not for SpCell. If cell DTX is configured and T312 expires during the cell DTX duration of SpCell and if cell DTX duration of SpCell is larger than or equal to the threshold, the UE does not declare RLF and the UE restarts T312 after the DRX duration ends. If cell DTX is not configured for SpCell and T312 expires; or if cell DTX is configured for SpCell and T312 expires outside the cell DTX duration of SpCell; or if cell DTX duration of SpCell is smaller than or equal to the threshold and if T312 expires during the cell DTX duration of SpCell: the UE declares RLF. An indication can be included in an RRC configuration message to determine whether the UE performs this operation or not. The indication can be common or per cell DTX configuration.

In the above description, it is assumed that during cell DTX duration RLM RSs (i.e., SSBs/CSI RSs etc.) are not transmitted from a cell/SpCell (or a base station supporting the cell/SpCell).

[Method 3]

Figure 9:
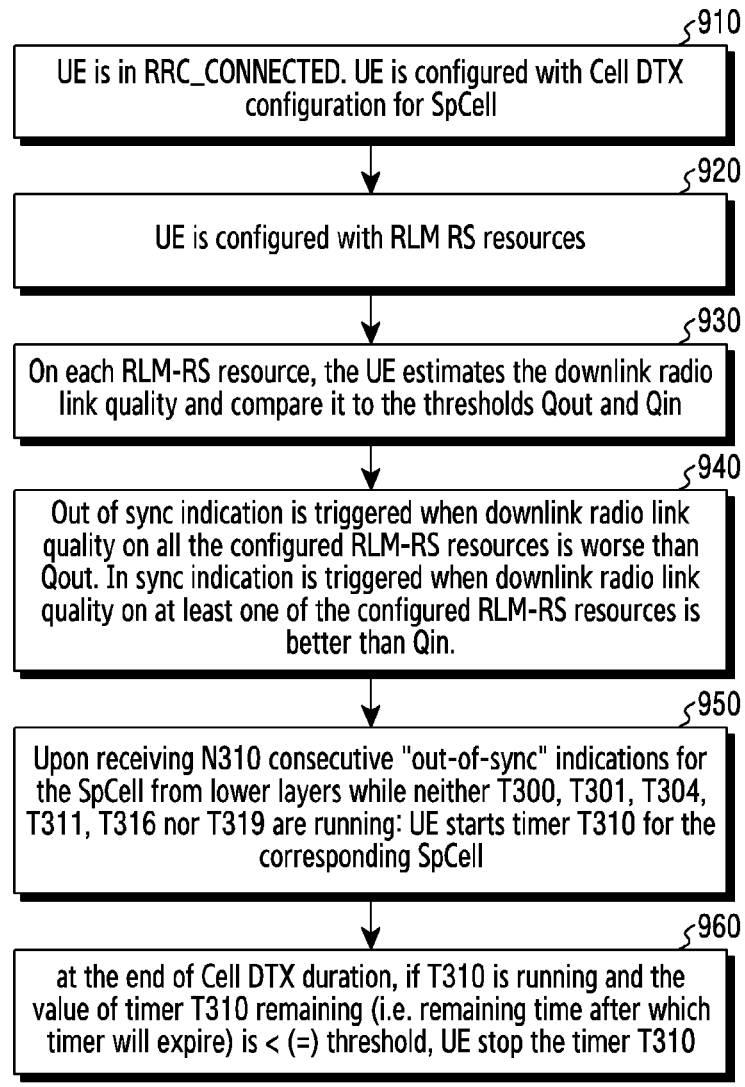
FIG. 9 illustrates yet another example of RLF handling for a cell supporting network energy saving in accordance with an embodiment of the present disclosure.
Figure 10:
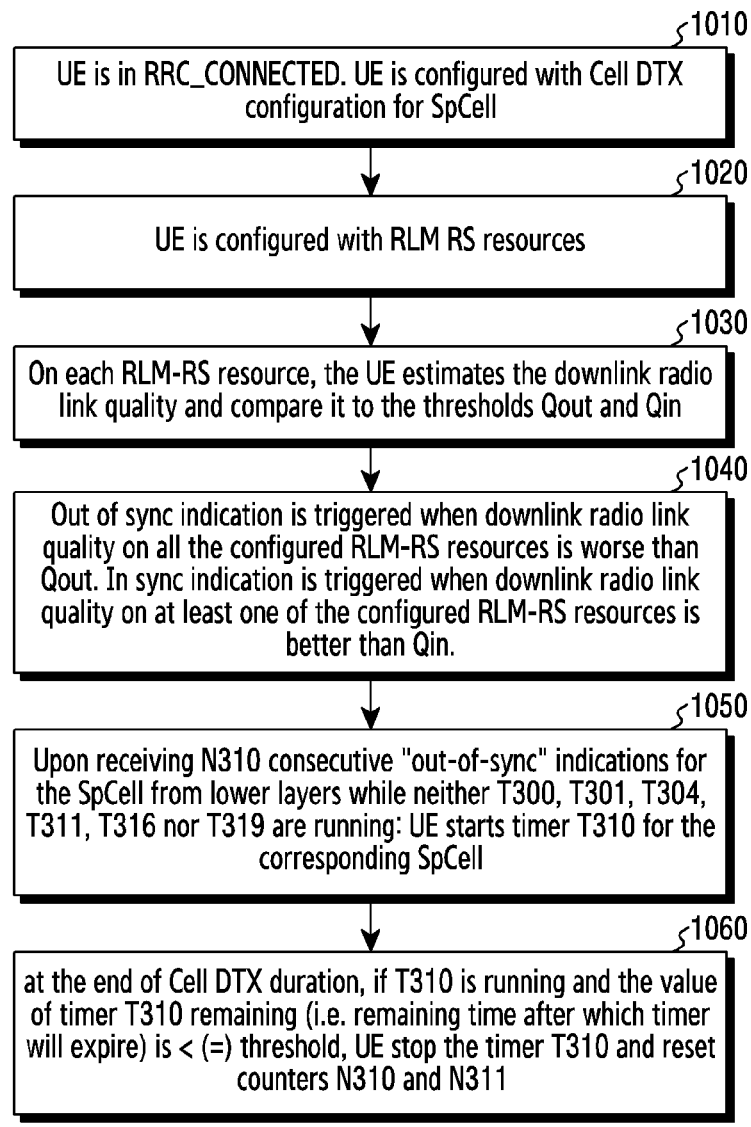
FIG. 10 illustrates yet another example of RLF handling for a cell supporting network energy saving in accordance with an embodiment of the present disclosure.

FIG. 9 and FIG. 10 illustrate examples of RLF handling for a cell supporting network energy saving in accordance with an embodiment of the present disclosure.

A UE is in an RRC_CONNECTED state. Periodic cell DTX pattern may be configured for an SpCell (910, 1010). The periodic cell DTX pattern may be configured by a "duration" and "period" field wherein during the "duration" interval which occurs periodically every "period," a cell (i.e., a base station supporting the cell) does not perform transmission (or stops certain transmissions (e.g., PDSCH, PBCH, SSBs, etc.) and during the interval "period-duration" cell (i.e., a base station supporting the cell) perform transmission. Alternately, periodic cell DTX pattern may be configured by a "duration" and "period" field wherein during the "duration" interval which occurs periodically every "period," a cell (i.e., a base station supporting the cell) perform transmission and during the interval "period-duration" cell does not perform transmission (or stops certain transmissions (e.g., PDSCH, PBCH, SSBs, etc.)).

Periodic cell DRX pattern may be configured by a "duration" and "period" field wherein during the "duration" interval which occurs periodically every "period," a cell (i.e., a base station supporting the cell) does not perform reception (or stops certain receptions e.g., PUCCH, PUSCH, PRACH etc.) and during the interval "period-duration" cell (i.e., a base station supporting the cell) perform transmission. Alternately, periodic cell DRX pattern may be configured by a "duration" and "period" field wherein during the "duration" interval which occurs periodically every "period," a cell (i.e., a base station supporting the cell) perform reception and during the interval "period-duration" cell does not perform transmission (or stops certain transmissions (e.g., PDSCH, PBCH, SSBs, etc.)).

During the cell level DRX duration where network (i.e., base station) does not receive transmission (or certain transmissions) from the UE on the uplink of that cell, the UE does not transmit (or does not transmit) certain transmissions in uplink of that cell. In an embodiment, network DTX duration in above description can be the cell level inactive duration where cell does not transmit any transmission to the UE or does not transmit any dedicated transmission to the UE or does not transmit certain transmissions (e.g., PDSCH, PBCH, etc.) to the UE. The above configuration can be configured for SpCell or one or more serving cells.

A UE is configured with RLM-RS resources (s) for the SpCell (920, 1020). On each RLM-RS resource, the UE estimates the downlink radio link quality and compare the quality to the thresholds $Q_{out}$ and $Q_{in}$ (930, 1030). Here, $Q_{out}$ is a level at which the downlink radio link cannot be reliably received and corresponds to the out-of-sync block error rate ($BLER_{out}$). And $Q_{in}$ is a level at which the downlink radio link quality can be received with higher reliability and correspond to the in-sync block error rate ($BLER_{in}$). $BLER_{out}$ and $BLER_{in}$ are signaled. Out of sync indication occurs when downlink radio link quality on all the configured RLM-RS resources is worse than $Q_{out}$. In sync indication occurs when downlink radio link quality on at least one of the configured RLM-RS resources is better than $Q_{in}$ (940, 1040). Upon receiving N310 consecutive "out-of-sync" indications for the SpCell from lower layers while neither T300, T301, T304, T311, T316 nor T319 are running: the UE starts timer T310 for the corresponding SpCell (950, 1050). Upon receiving N311 consecutive "in-sync" indications for the SpCell from lower layers while T310 is running, the UE may: stop timer T310 for the corresponding SpCell.

If T312 is configured in MCG: the UE starts T312 upon triggering a measurement report for a measurement identity for which T312 has been configured and use T312 configuration information has been set to true, while T310 in PCell is running. If T312 is configured in SCG and use T312 configuration information has been set to true: the UE start T312 upon triggering a measurement report for a measurement identity for which T312 has been configured, while T310 in PSCell is running. T312 is stopped, upon receiving N311 consecutive in-sync indications from lower layers for the SpCell, receiving RRCReconfiguration with reconfigurationWithSync for that cell group, upon reception of MobilityFromNRCommand, upon initiating the connection re-establishment procedure, upon the reconfiguration of rlf-TimersAndConstant, upon initiating the MCG failure information procedure, upon conditional reconfiguration execution i.e., when applying a stored RRCReconfiguration message including reconfiguration WithSync for that cell group, and upon the expiry of T310 in corresponding SpCell; Upon SCG release, if the T312 is kept in SCG.

In an embodiment of this disclosure, at the end of cell DTX duration, if T310 is running and the value of timer T310 remaining (i.e., remaining time after which timer may expire) is smaller than or equal to a threshold, the UE stops the timer T310 (960). The threshold can be signaled by a gNB in an RRC message or system information. The threshold can be per cell group or per cell or per BWP. An example of this is shown in FIG. 9. An indication can be included in an RRC configuration message to determine whether the UE performs this operation or not. The indication can be common or per cell DTX configuration.

In another embodiment of this disclosure, at the end of cell DTX duration, if T310 is running and the value of timer T310 remaining (i.e., remaining time after which timer may expire) is smaller than or equal to a threshold, the UE stops the timer T310 and reset counters N310 and N311 (1060). The threshold can be signaled by a gNB in an RRC message or system information. The threshold can be per cell group or per cell or per BWP. An example of this is shown in FIG. 10. An indication can be included in an RRC configuration message to determine whether the UE performs this operation or not. The indication can be common or per cell DTX configuration.

In another embodiment of this disclosure, at the end of cell DTX duration, if T310 is running and the value of timer T310 remaining (i.e., remaining time after which timer may expire) is smaller than or equal to a threshold and if cell DTX duration of SpCell is larger than or equal to a threshold1 which is different from the threshold, the UE stops the timer T310. The threshold and threshold1 can be signaled by a gNB in an RRC message or system information. The threshold can be per cell group or per cell or per BWP. An indication can be included in an RRC configuration message to determine whether the UE performs this operation or not. The indication can be common or per cell DTX configuration.

In another embodiment of this disclosure, at the end of cell DTX duration, if T310 is running and the value of timer T310 remaining (i.e., remaining time after which timer may expire) is smaller than or equal to a threshold and if cell DTX duration of SpCell is larger than or equal to the threshold, the UE stops the timer T310 and reset counters N310 and N311. The threshold can be signaled by a gNB in an RRC message or system information. The threshold can be per cell group or per cell or per BWP. An indication can be included in an RRC configuration message to determine whether the UE performs this operation or not. The indication can be common or per cell DTX configuration.

In another embodiment of this disclosure, at the end of cell DTX duration, if T312 is running and the value of timer T312 remaining (i.e., remaining time after which timer may expire) is smaller than or equal to a threshold, the UE stops the timer T312. The threshold can be signaled by a gNB in an RRC message or system information. The threshold can be per cell group or per cell or per BWP. An indication can be included in an RRC configuration message to determine whether the UE performs this operation or not. The indication can be common or per cell DTX configuration.

In embodiment of this disclosure, at the end of cell DTX duration, if T312 is running and the value of timer T312 remaining (i.e., remaining time after which timer may expire) is smaller than or equal to a threshold and if cell DTX duration of SpCell is larger than or equal to a threshold1 which is different from the threshold, the UE stops the timer T312. The threshold and threshold1 can be signaled by a gNB in an RRC message or system information. The threshold can be per cell group or per cell or per BWP. An indication can be included in an RRC configuration message to determine whether the UE performs this operation or not. The indication can be common or per cell DTX configuration.

In the above description, it is assumed that during cell DTX duration RLM RSs (i.e., SSBs/CSI RSs etc.) are not transmitted from a cell/SpCell (or a base station supporting the cell/SpCell).

[Method 4]

Figure 11:
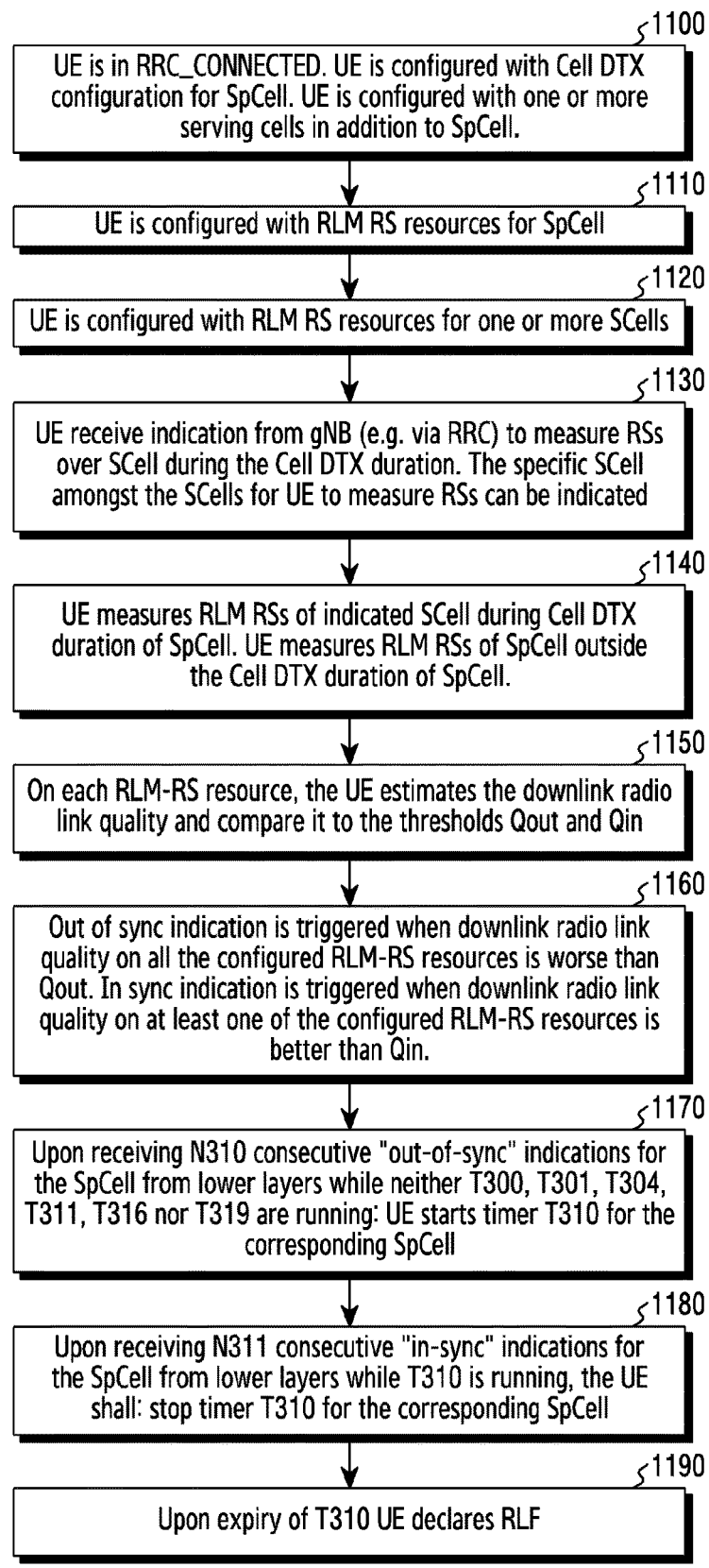
FIG. 11 illustrates yet another example of RLF handling for a cell supporting network energy saving in accordance with an embodiment of the present disclosure.
Figure 12:
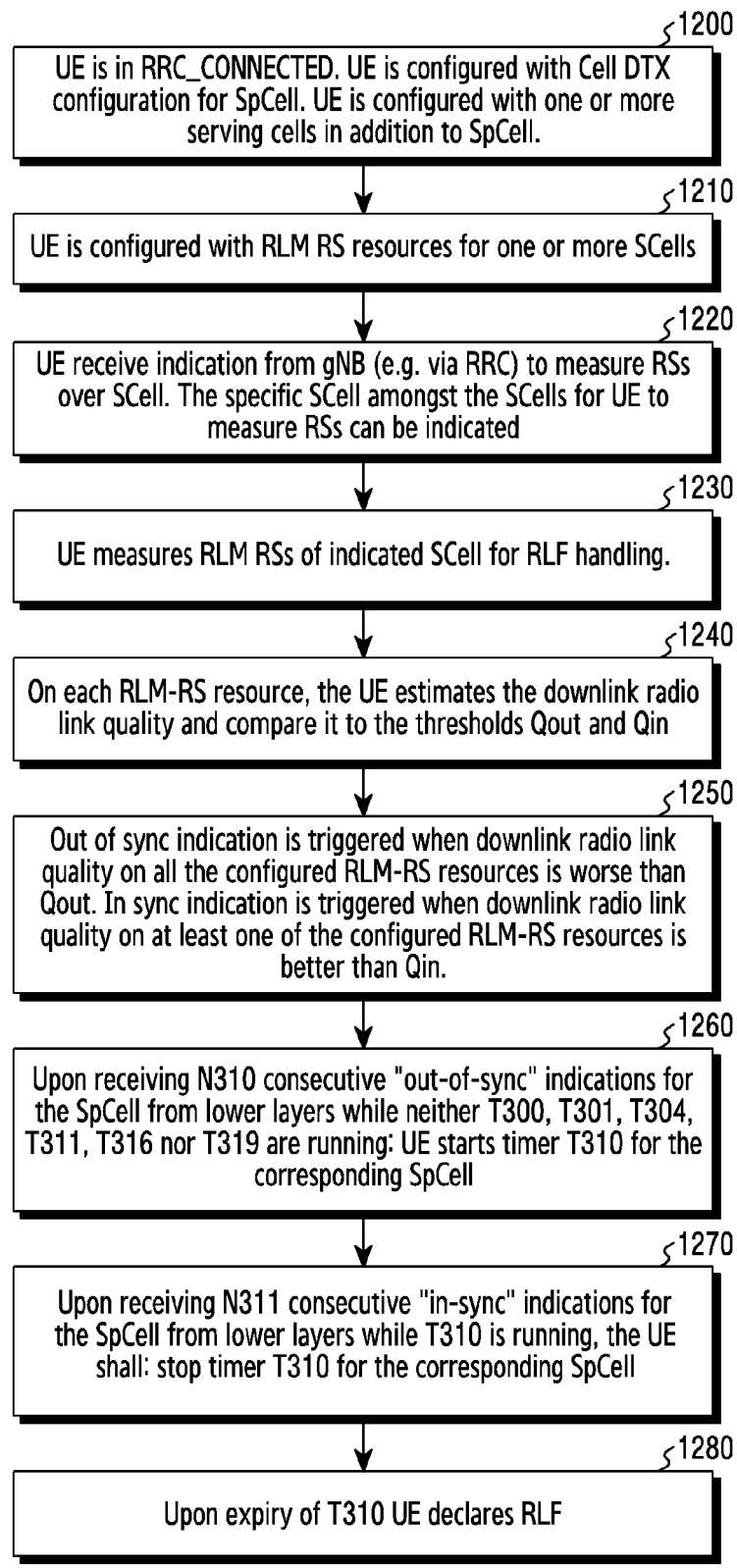
FIG. 12 illustrates yet another example of RLF handling for a cell supporting network energy saving in accordance with an embodiment of the present disclosure.

FIG. 11 and FIG. 12 illustrate examples of RLF handling for a cell supporting network energy saving in accordance with an embodiment of the present disclosure.

A UE is in an RRC_CONNECTED state and is configured with SpCell and one or more serving cells (1100, 1200).

Periodic cell DTX pattern may be configured for an SpCell (1100, 1200). The periodic cell DTX pattern may be configured by a "duration" and "period" field wherein during the "duration" interval which occurs periodically every "period," a cell (i.e., a base station supporting the cell) does not perform transmission (or stops certain transmissions (e.g., PDSCH, PBCH, SSBs, etc.) and during the interval "period-duration" cell (i.e., a base station supporting the cell) perform transmission. Alternately, periodic cell DTX pattern may be configured by a "duration" and "period" field wherein during the "duration" interval which occurs periodically every "period," a cell (i.e., a base station supporting the cell) perform transmission and during the interval "period-duration" cell does not perform transmission (or stops certain transmissions (e.g., PDSCH, PBCH, SSBs, etc.)).

Periodic cell DRX pattern may be configured by a "duration" and "period" field wherein during the "duration" interval which occurs periodically every "period," a cell (i.e., a base station supporting the cell) does not perform reception (or stops certain receptions e.g., PUCCH, PUSCH, PRACH etc.) and during the interval "period-duration" cell (i.e., a base station supporting the cell) perform transmission. Alternately, periodic cell DRX pattern may be configured by a "duration" and "period" field wherein during the "duration" interval which occurs periodically every "period," a cell (i.e., a base station supporting the cell) perform reception and during the interval "period-duration" cell does not perform transmission (or stops certain transmissions (e.g., PDSCH, PBCH, SSBs, etc.)). During the cell level DRX duration where network (i.e., base station) does not receive transmission (or certain transmissions) from the UE on the uplink of that cell, the UE does not transmit (or does not transmit) certain transmissions in uplink of that cell. In an embodiment, network DTX duration in above description can be the cell level inactive duration where cell does not transmit any transmission to the UE or does not transmit any dedicated transmission to the UE or does not transmit certain transmissions (e.g., PDSCH, PBCH, etc.) to the UE. The above configuration can be configured for SpCell or one or more serving cells.

A UE is configured with RLM-RS resources (s) for SpCell (1110). In an embodiment, a gNB can also indicate (e.g., via RRC) the UE to measure RSs over SCell during the cell DTX duration (1120). The specific SCell amongst the SCells for the UE to measure RSs can be indicated (implicit by configuration of RLM RSs in SCell configuration or explicit indication can be included) (1130). The UE measures RLM RSs of indicated SCell during cell DTX duration of SpCell. The UE measures RLM RSs of SpCell outside the cell DTX duration of SpCell (1140). Outside the DTX duration, the UE measures RLM RS resource(s) of SpCell. (FIG. 11)

On each RLM-RS resource, the UE estimates the downlink radio link quality and compare the quality to the thresholds $Q_{out}$ and $Q_{in}$ (1150, 1240). Here, $Q_{out}$ is a level at which the downlink radio link cannot be reliably received and corresponds to the out-of-sync block error rate ($BLER_{out}$). And $Q_{in}$ is a level at which the downlink radio link quality can be received with higher reliability and correspond to the in-sync block error rate ($BLER_{in}$). $BLER_{out}$ and $BLER_{in}$ are signaled. Out of sync indication occurs when downlink radio link quality on all the configured RLM-RS resources is worse than $Q_{out}$. In sync indication occurs when downlink radio link quality on at least one of the configured RLM-RS resources is better than $Q_{in}$ (1160, 1250). Upon receiving N310 consecutive "out-of-sync" indications for the SpCell from lower layers while neither T300, T301, T304, T311, T316 nor T319 are running: the UE starts timer T310 for the corresponding SpCell (1170, 1260). Upon receiving N311 consecutive "in-sync" indications for the SpCell from lower layers while T310 is running, the UE may: stop timer T310 for the corresponding SpCell (1180, 1270). Upon expiry of timer T310, RLF is declared (1190, 1280).

In another embodiment, when cell DTX is configured for the SpCell, a gNB can indicate the UE to measure RSs over SCell (1210, 1220) and consider the measurement of the SCell as that of PCell/PSCell (regardless of DTX duration/on duration of SpCell). The specific SCell amongst the SCells for the UE to measure RSs can be indicated (implicit by configuration of RLM RSs in SCell configuration or explicit indication can be included) (1220). The UE measures RLM RSs of indicated SCell for RLF handling (1230). (FIG. 12)

In another embodiment, when cell DTX is configured for the SpCell, a gNB can indicate a UE to measure RSs over SCell and consider the measurement of the SCell as that of PCell/PSCell (regardless of DTX duration/on duration of SpCell) when cell DTX for SpCell is activated. If cell DTX for SpCell is configured but not yet activated, the UE measures RLM RSs of SpCell for RLF handling. The specific SCell amongst the SCells for the UE to measure RSs can be indicated (implicit by configuration of RLM RSs in SCell configuration or explicit indication can be there).

In another embodiment, if cell DTX is configured and activated for SpCell, a UE suspends RLF measurements at the start of cell DTX duration of SpCell and resumes RLF measurements at the end of cell DTX duration. In an alternate embodiment, if cell DTX is configured and activated for SpCell, the UE suspends radio link management procedure at the start of cell DTX duration of SpCell and resumes radio link measurement procedure at the end of cell DTX duration.

In another in the disclosure, the above methods are applied for the cell DTX mode where RLM RSs are not transmitted during the cell DTX duration. If RLM RSs are transmitted during cell DTX duration, a UE applies the legacy RLF procedure.

Figure 13:
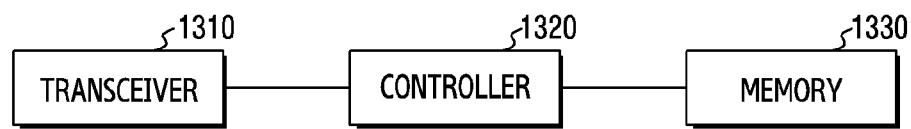
FIG. 13 illustrates a terminal according to an embodiment of the present disclosure.

FIG. 13 illustrates a terminal according to an embodiment of the present disclosure.

Referring to FIG. 13, a terminal includes a transceiver 1310, a controller 1320 and a memory 1330. The controller 1320 may refer to a circuitry, an application-specific integrated circuit (ASIC), or at least one processor. The transceiver 1310, the controller 1320 and the memory 1330 are configured to perform the operations of the UE illustrated in the figures, e.g., FIGS. 1 to 12 or described above. Although the transceiver 1310, the controller 1320 and the memory 1330 are shown as separate entities, they may be realized as a single entity like a single chip. Or the transceiver 1310, the controller 1320 and the memory 1330 may be electrically connected to or coupled with each other.

The transceiver 1310 may transmit and receive signals to and from other network entities, e.g., a base station. The controller 1320 may control the UE to perform functions according to one of the embodiments described above.

In an embodiment, the operations of the terminal may be implemented using the memory 1330 storing corresponding program codes. Specifically, the terminal may be equipped with the memory 1330 to store program codes implementing desired operations. To perform the desired operations, the controller 1320 may read and execute the program codes stored in the memory 1330 by using a processor or a central processing unit (CPU).

Figure 14:
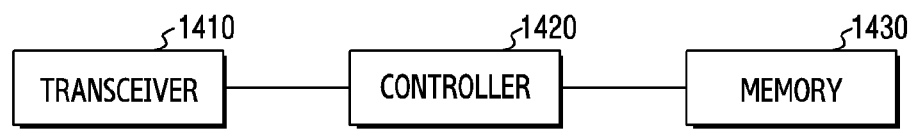
FIG. 14 illustrates a base station according to an embodiment of the present disclosure.

FIG. 14 illustrates a base station according to an embodiment of the present disclosure.

Referring to FIG. 14, a base station includes a transceiver 1410, a controller 1420 and a memory 1430. The transceiver 1410, the controller 1420 and the memory 1430 are configured to perform the operations of the network (e.g., gNB) illustrated in the figures, e.g., FIGS. 1 to 12 or described above. Although the transceiver 1410, the controller 1420 and the memory 1430 are shown as separate entities, they may be realized as a single entity like a single chip. The transceiver 1410, the controller 1420 and the memory 1430 may be electrically connected to or coupled with each other.

The transceiver 1410 may transmit and receive signals to and from other network entities, e.g., a terminal. The controller 1420 may control the base station to perform functions according to one of the embodiments described above. The controller 1420 may refer to a circuitry, an ASIC, or at least one processor. In an embodiment, the operations of the base station may be implemented using the memory 1430 storing corresponding program codes. Specifically, the base station may be equipped with the memory 1430 to store program codes implementing desired operations. To perform the desired operations, the controller 1420 may read and execute the program codes stored in the memory 1430 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   receiving, from a base station, a radio resource control (RRC) message including first information configuring a cell discontinuous transmission (DTX) for a special cell (SpCell) and second information configuring at least one radio link monitoring reference signal (RLM RS) resource for the SpCell; and
   starting a T310 timer according to a number of consecutive out of sync indications received for the SpCell, wherein the number of consecutive out of sync indications is based on a downlink radio link quality associated with the at least one RLM RS resource,
   wherein, in case that the T310 timer expires during a duration of the cell DTX for the SpCell, the UE does not declare a radio link failure (RLF) for the SpCell, and
   wherein, in case that the T310 timer expires outside the duration of the cell DTX for the SpCell, the UE declares the RLF for the SpCell.

2. The method of claim 1, wherein the T310 timer is stopped and an N310 counter and an N311 counter are reset, in case that the cell DTX for the SpCell is started and the duration of the cell DTX for the SpCell is larger than or equal to a first threshold.

3. The method of claim 1,
   wherein, in case that the T310 timer expires during the duration of the cell DTX for the SpCell, the T310 timer is restarted at an end of the duration of the cell DTX for the SpCell.

4. The method of claim 1, wherein the T310 timer is stopped, in case that the T310 timer is running at an end of the duration of the cell DTX for the SpCell and a remaining value of the T310 timer is smaller than or equal to a second threshold.

5. The method of claim 1, wherein the RRC message further includes third information indicating the UE to stop the T310 timer.

6. The method of claim 5, wherein the third information is common for one or more cell DTX configurations or is specific for the cell DTX for the SpCell.

7. The method of claim 1, wherein the first information includes the duration for the cell DTX and a period for the cell DTX, and
   wherein the base station does not perform a downlink transmission during the duration which occurs for the period.

8. A user equipment (UE) comprising:
   at least one transceiver;

at least one processor communicatively coupled to the at least one transceiver; and at least one memory, communicatively coupled to the at least one processor, storing instructions executable by the at least one processor individually or in any combination to cause the UE to:

receive, from a base station, a radio resource control (RRC) message including first information configuring a cell discontinuous transmission (DTX) for a special cell (SpCell) and second information configuring at least one radio link monitoring reference signal (RLM RS) resource for the SpCell, and start a T310 timer according to a number of consecutive out of sync indications received for the SpCell, wherein the number of consecutive out of sync indications is based on a downlink radio link quality associated with the at least one RLM RS resource, wherein, in case that the T310 timer expires during a duration of the cell DTX for the SpCell, the UE does not declare a radio link failure (RLF) for the SpCell, and wherein, in case that the T310 timer expires outside the duration of the cell DTX for the SpCell, the UE declares the RLF for the SpCell.

9. The UE of claim 8, wherein the T310 timer is stopped and an N310 counter and an N311 counter are reset, in case that the cell DTX for the SpCell is started and the duration of the cell DTX for the SpCell is larger than or equal to a first threshold.

10. The UE of claim 8, wherein, in case that the T310 timer expires during the duration of the cell DTX for the SpCell, the T310 timer is restarted at an end of the duration of the cell DTX for the SpCell.

11. The UE of claim 8, wherein the T310 timer is stopped, in case that the T310 timer is running at an end of the duration of the cell DTX for the SpCell and a remaining value of the T310 timer is smaller than or equal to a second threshold.

12. The UE of claim 8, wherein the RRC message further includes third information indicating the UE to stop the T310 timer.

13. The UE of claim 12, wherein the third information is common for one or more cell DTX configurations or is specific for the cell DTX for the SpCell.

14. The UE of claim 8, wherein the first information includes a duration for the cell DTX and a period for the cell DTX, and wherein the base station does not perform a downlink transmission during the duration which occurs for the period.

* * * * *